US012384598B2

(12) United States Patent
Ryono et al.

(10) Patent No.: US 12,384,598 B2
(45) Date of Patent: Aug. 12, 2025

(54) HOUSING CASE FOR FUSION SPLICER AND FUSION SPLICER SET

(71) Applicant: Sumitomo Electric Optifrontier Co., Ltd., Yokohama (JP)

(72) Inventors: Yuta Ryono, Yokohama (JP); Kazufumi Joko, Yokohama (JP); Tomoyoshi Sasaki, Yokohama (JP); Ryuichiro Sato, Yokohama (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 210 days.

(21) Appl. No.: 18/248,245

(22) PCT Filed: Oct. 12, 2021

(86) PCT No.: PCT/JP2021/037770
§ 371 (c)(1),
(2) Date: Apr. 7, 2023

(87) PCT Pub. No.: WO2022/080382
PCT Pub. Date: Apr. 21, 2022

(65) Prior Publication Data
US 2023/0373686 A1    Nov. 23, 2023

(30) Foreign Application Priority Data
Oct. 15, 2020  (JP) ................................. 2020-174183

(51) Int. Cl.
*B65D 85/38*      (2006.01)
*B65D 1/34*       (2006.01)
(Continued)

(52) U.S. Cl.
CPC ............. *B65D 25/005* (2013.01); *B65D 1/34* (2013.01); *B65D 25/54* (2013.01); *B65D 43/16* (2013.01);
(Continued)

(58) Field of Classification Search
CPC ........ B65D 1/34; B65D 25/54; B65D 77/046; B65D 85/38; B65D 25/2841;
(Continued)

(56) References Cited

U.S. PATENT DOCUMENTS 5,386,922 A * 2/1995 Jordan ............... B65D 77/0486
220/4.27
5,680,932 A * 10/1997 Dickinson .............. B25H 3/023
220/523
(Continued)

FOREIGN PATENT DOCUMENTS

EP    2660634 A1    11/2013
EP    2801848 B1     7/2017
(Continued)

OTHER PUBLICATIONS

International Search Report issued in Patent Application No. PCT/JP2021/037770 dated Jan. 11, 2022.

*Primary Examiner* — Steven A. Reynolds
(74) *Attorney, Agent, or Firm* — MCDONALD HOPKINS LLC

(57) ABSTRACT

A housing case for a fusion splicer is a housing case for housing the fusion splicer for an optical fiber. The housing case for a fusion splicer includes a case main body including a first side wall, and a lid body attached to the case main body to be openable and closable. The lid body includes a second side wall configured to match the first side wall when closed. At least one of the first side wall and the second side wall includes an insertion portion configured for a cable extending from the inside of the housing case to the outside (Continued)

thereof to be inserted through the insertion portion in a state where the lid body is closed with respect to the case main body.

12 Claims, 15 Drawing Sheets

(51) Int. Cl.
  *B65D 25/00* (2006.01)
  *B65D 25/54* (2006.01)
  *B65D 43/16* (2006.01)
  *B65D 77/04* (2006.01)
  B65D 25/28 (2006.01)
  G02B 6/255 (2006.01)

(52) U.S. Cl.
  CPC ............ *B65D 77/046* (2013.01); *B65D 85/38* (2013.01); *B65D 25/2841* (2013.01); *B65D 2251/1058* (2013.01); *B65D 2543/00194* (2013.01); *B65D 2543/00351* (2013.01); *G02B 6/2553* (2013.01)

(58) Field of Classification Search
  CPC ........... B65D 2543/00194; B65D 2543/00351; G02B 6/2553

USPC ............................................ 206/349; 385/96
See application file for complete search history.

(56) References Cited

U.S. PATENT DOCUMENTS

| | | | |
|---|---|---|---|
| 7,693,385 | B1 | 4/2010 | Trotman et al. |
| 9,122,010 | B2* | 9/2015 | Koinkar .................... G02B 6/46 |
| 2013/0284377 | A1* | 10/2013 | Takayanagi .......... G02B 6/2553 |
| | | | 156/433 |
| 2013/0336621 | A1 | 12/2013 | Zaxquarim et al. |
| 2014/0110280 | A1* | 4/2014 | Clark .................... B65D 43/162 |
| | | | 206/217 |
| 2014/0157830 | A1 | 6/2014 | Kawanishi |

FOREIGN PATENT DOCUMENTS

| | | |
|---|---|---|
| JP | H02-199412 A | 8/1990 |
| JP | H08-327848 A | 12/1996 |
| JP | 2004-191597 A | 7/2004 |
| JP | 2010-039002 A | 2/2010 |
| JP | 2011-203534 A | 10/2011 |
| JP | 2012-141357 A | 7/2012 |
| JP | 2014-074796 A | 4/2014 |
| JP | 2014-519616 A | 8/2014 |
| WO | 2012/105825 A2 | 8/2012 |
| WO | 2016/042671 A1 | 3/2016 |

* cited by examiner

HOUSING CASE FOR FUSION SPLICER AND FUSION SPLICER SET

TECHNICAL FIELD

The present disclosure relates to a housing case for a fusion splicer and a fusion splicer set. This application is based upon and claims the benefit of priority from Japanese Patent Application No. 2020-174183 filed on Oct. 15, 2020, the entire contents of which are incorporated herein by reference.

BACKGROUND ART

Patent Literature 1 discloses an example of a housing case that houses a fusion splicer for an optical fiber. The housing case includes a case main body having a housing portion for housing the fusion splicer, and a lid body detachably attached to the case main body with hinges. Patent Literature 2 and 3 disclose other examples of housing cases.

CITATION LIST

Patent Literature

[Patent Literature 1] Japanese Unexamined Patent Publication No. 2014-074796
[Patent Literature 2] Japanese Unexamined Patent Publication No. 2010-039002
[Patent Literature 3] PCT International Publication No. WO2016/042671

SUMMARY OF INVENTION

An aspect of the present disclosure provides a housing case for a fusion splicer. The housing case for a fusion splicer is a housing case for housing the fusion splicer for an optical fiber. The housing case for a fusion splicer includes a case main body including a first side wall, and a lid body attached to the case main body to be openable and closable. The lid body includes a second side wall configured to match the first side wall when closed. At least one of the first side wall and the second side wall includes an insertion portion configured for a cable extending from the inside of the housing case to the outside thereof to be inserted through the insertion portion in a state where the lid body is closed with respect to the case main body.

Another aspect of the present disclosure provides a fusion splicer set. The fusion splicer set includes the above housing case, and a fusion splicer for an optical fiber housed in the housing case.

DESCRIPTION OF EMBODIMENTS

Figure 1:
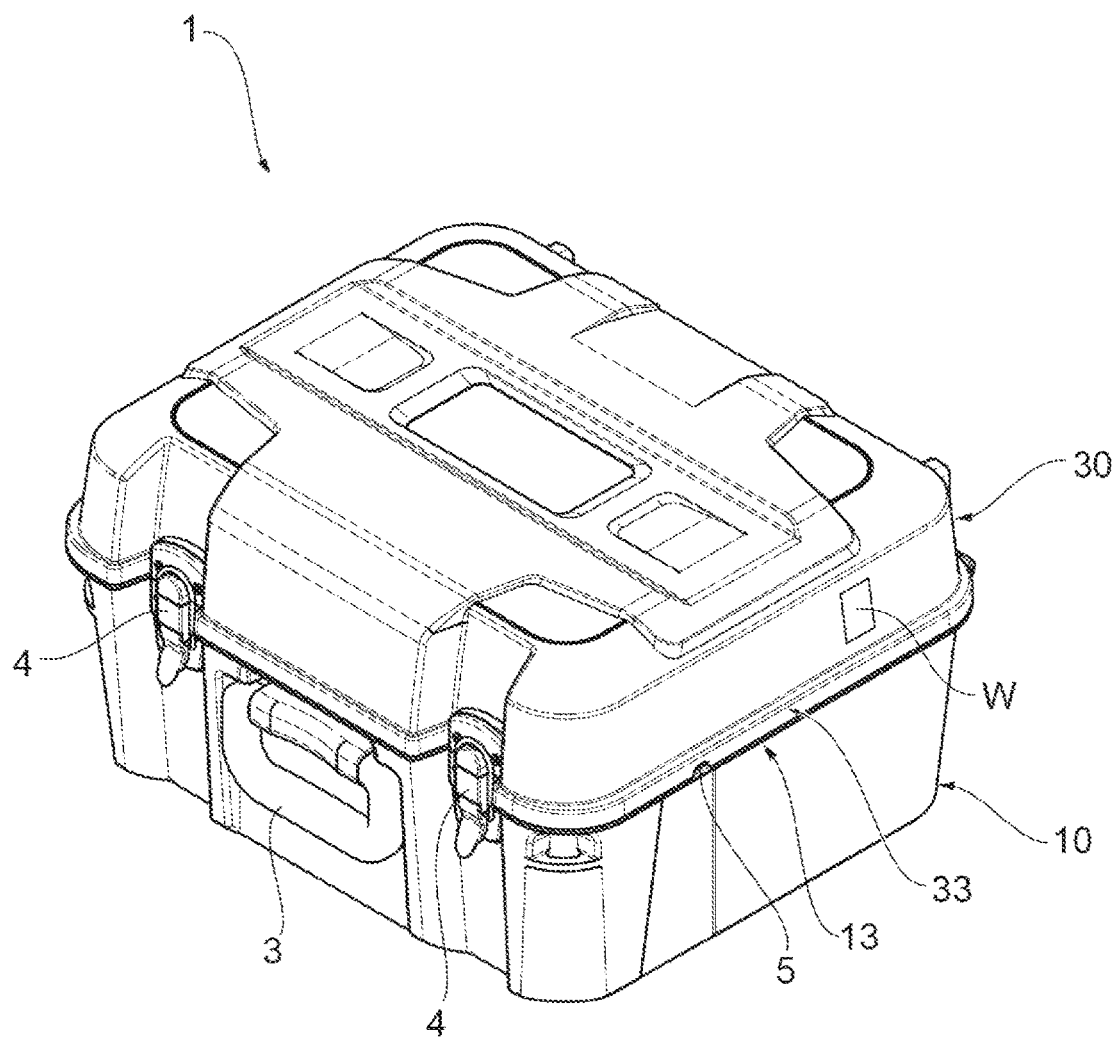
FIG. 1 is a perspective view illustrating a housing case according to an embodiment.

Problems to be Solved by the Present Disclosure

When power is supplied to a fusion splicer, the fusion splicer and the external power supply are connected through a power supply cable. When power is supplied to a fusion splicer housed in a housing case of the related art, it is necessary to leave a lid body in an opened state to prevent a power supply cable from being pinched between a case main body and the lid body and damaged. Thus, it is necessary to ensure a large arrangement space for the housing case when power is supplied to the fusion splicer. Therefore, there is a demand for a technique that allows the arrangement space of the housing case to be reduced when power is supplied to the fusion splicer.

An object of the present disclosure is to provide a housing case that can reduce an arrangement space when power is supplied to a fusion splicer.

Effects of the Present Disclosure

According to the aspect of the present disclosure, it is possible to reduce the arrangement space of the housing case when power is supplied to the fusion splicer.

DESCRIPTION OF EMBODIMENTS OF THE PRESENT DISCLOSURE

First, contents of embodiments of the present disclosure will be listed and described. A housing case according to an embodiment of the present disclosure is a housing case for housing the fusion splicer for an optical fiber. The housing case for a fusion splicer includes a case main body including a first side wall and a lid body attached to the case main body to be openable and closable. The lid body includes a second side wall configured to match the first side wall when closed. At least one of the first side wall and the second side wall includes an insertion portion configured for a cable extending from the inside of the housing case to the outside thereof to be inserted through the insertion portion in a state where the lid body is closed with respect to the case main body.

In this housing case, the insertion portion is provided, and the cable extending from the inside of the housing case to the outside is inserted through this insertion portion, and thus, even in a case where the lid body is closed with respect to the case main body, the cable is not pinched between the case main body and the lid body. As a result, according to this housing case, damage to the cable (for example, damage to the coating) due to the pinching is prevented. That is, in this housing case, power can be supplied to the fusion splicer with the lid body closed, and the arrangement space of the housing case can be reduced during power supply.

As an embodiment, the first side wall may include a first edge portion, the second side wall may include a second edge portion, and the first edge portion and the second edge portion may come into contact with each other when the lid body is closed with respect to the case main body. The insertion portion may include a case notch provided in at least one of the first edge portion and the second edge portion. According to the embodiment, since the insertion portion includes the case notch provided in the first edge portion of the first side wall or the second edge portion of the second side wall, the cable can be easily inserted through the insertion portion.

As an embodiment, the housing case for a fusion splicer may further include a sealing member configured to seal a gap between the insertion portion and the cable in a state where the lid body is closed with respect to the case main body. According to this embodiment, water droplets, dust, or the like is prevented from entering the housing case through a gap between the insertion portion and the cable. As a result, failure of the fusion splicer housed in the housing case can be curbed.

As an embodiment, the sealing member may be made of sponge rubber having a hardness of 20 or more and 40 or less. According to this embodiment, since the sealing member has appropriate elasticity, the sealing member comes into close contact with the surface of the cable. As a result, the gap between the insertion portion and the cable is more appropriately sealed, and the waterproofness or dustproofness of the housing case is improved.

As an embodiment, the sealing member may be disposed such that the entire sealing member is located closer to the inside of the housing case than outermost peripheral surfaces of the first side wall and the second side wall. According to this embodiment, it is possible to prevent the sealing member from peeling off from the housing case due to external impact or the like.

As an embodiment, the sealing member may include a first sealing member provided in the first edge portion and a second sealing member provided in the second edge portion. The first sealing member and the second sealing member may be located such that the cable is sandwiched therebetween in a thickness direction of the housing case when the lid body is closed. According to this embodiment, the sealing member can be easily disposed around the cable.

As an embodiment, the housing case for a fusion splicer may further include a tray on which the fusion splicer is able to be placed. The tray may be able to be housed in the case main body such that the housing case is partitioned into an upper side housing space and a lower side housing space in a thickness direction of the housing case. According to this embodiment, tools such as devices and chemicals used for the fusion splicing work can be arranged and housed in the housing case. That is, the internal space of the housing case can be effectively utilized.

As an embodiment, at least one tray notch that connects the upper side housing space and the lower side housing space to each other may be provided in an outer peripheral edge portion of the tray. According to this embodiment, the devices disposed in the upper side housing space and the lower side housing space can be cable-connected via the tray notch. That is, the degree of freedom in arranging cable-connected devices is improved.

As an embodiment, at least one of the case main body and the lid body may include a window portion made of a transparent member. The window portion may be formed at a position at which a charging status of the fusion splicer charged through the cable is able to be visually recognized. According to this embodiment, the power supply status of the fusion splicer can be easily checked through the window portion without opening the lid body.

A fusion splicer set according to an embodiment of the present disclosure includes the housing case according to any one of the embodiments described above and a fusion splicer for an optical fiber housed in the housing case. According to this fusion splicer set, it is possible to obtain the same effect as each embodiment of the housing case for a fusion splicer described above.

Details of Embodiment of the Present Disclosure

An embodiment of the present disclosure will be described in detail below with reference to the accompanying drawings. The present invention is not limited to this example, but is defined by the scope of the claims, and is intended to include meanings equivalent to the scope of the claims and all modifications within the scope. In the following description, the same reference signs will be used for the same elements or elements having the same functions, and redundant description will be omitted.

Figure 2:
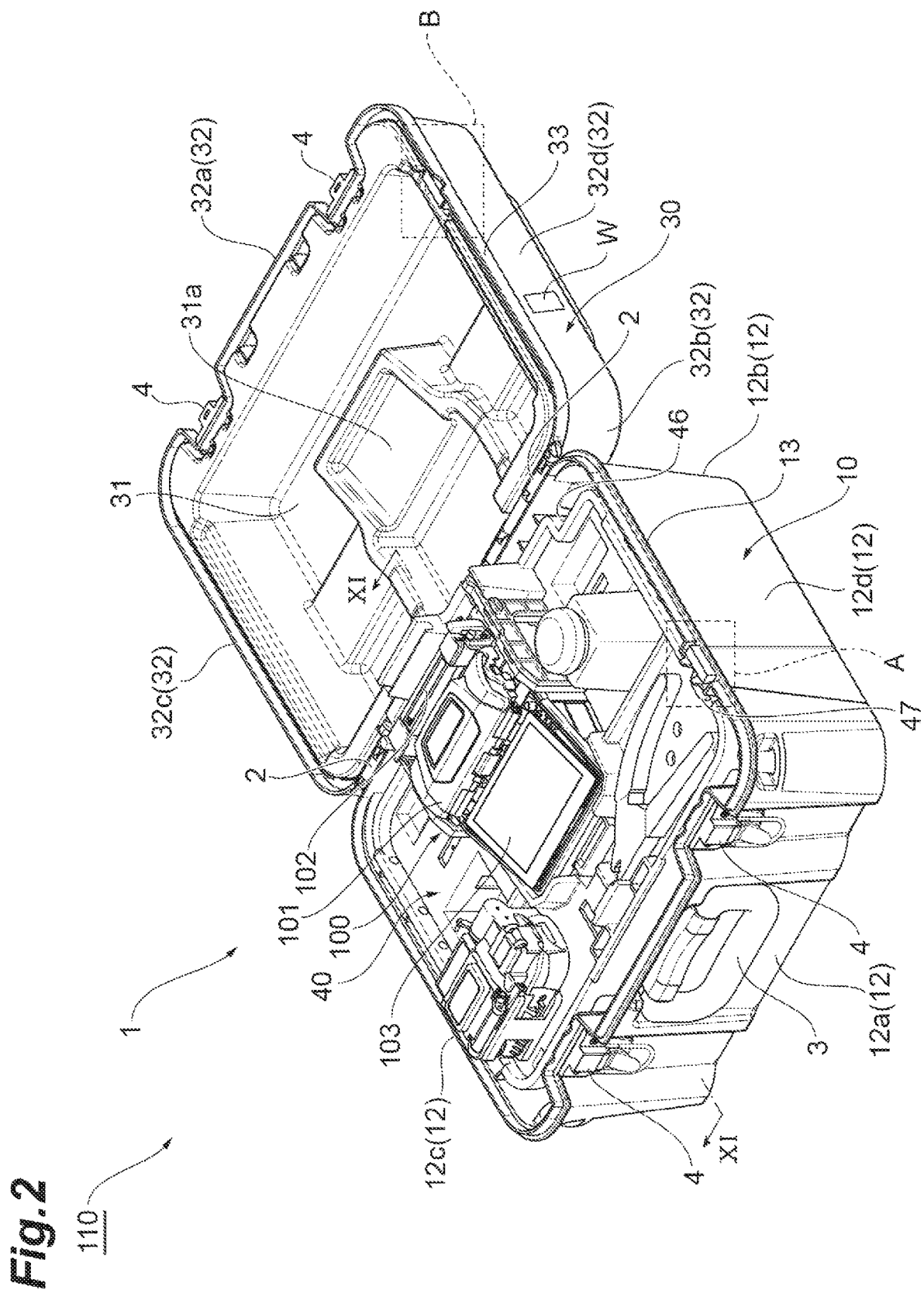
FIG. 2 is a perspective view illustrating a fusion splicer set that includes the housing case with a lid body opened with respect to a case main body.
Figure 3:
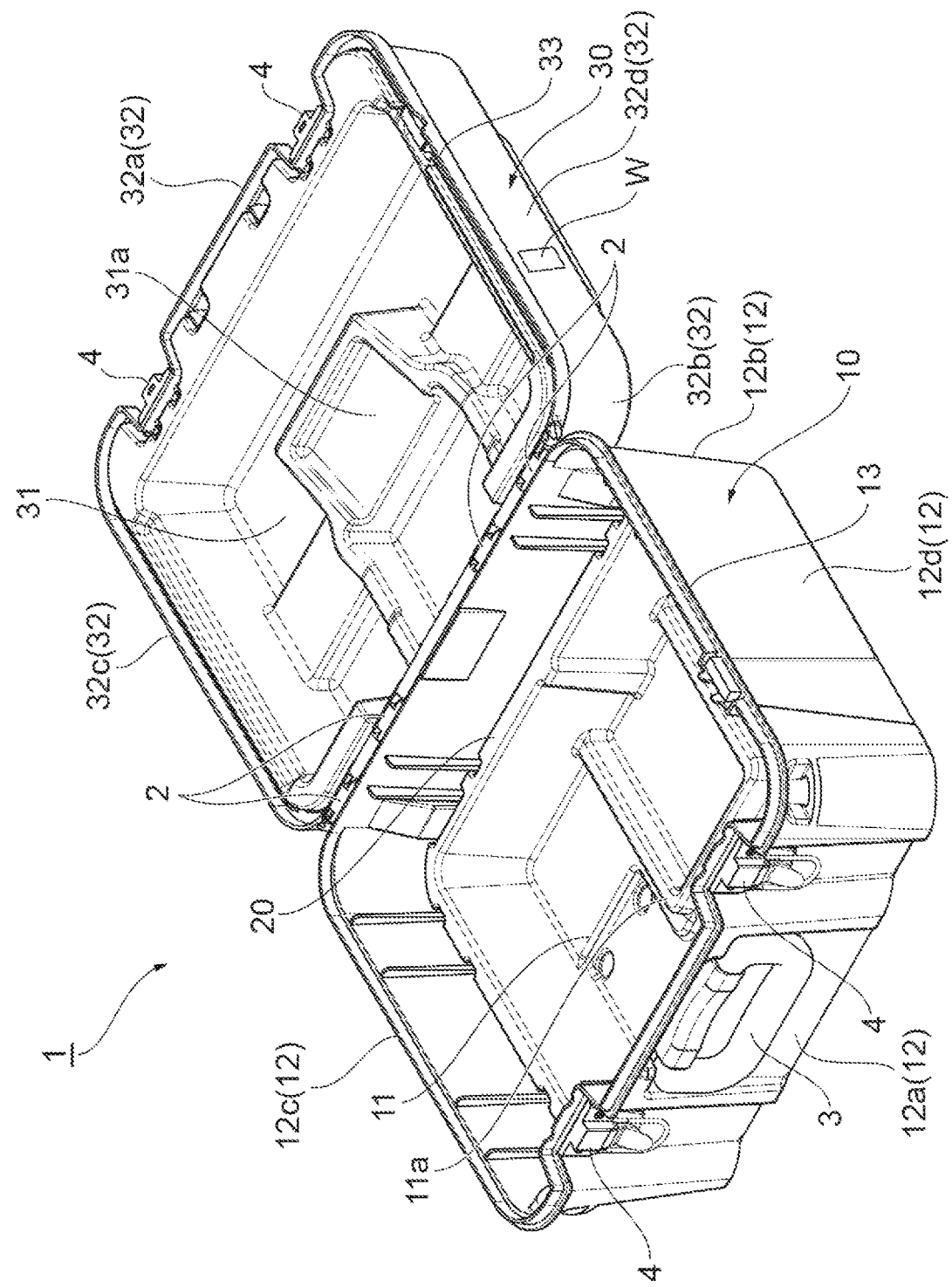
FIG. 3 is a perspective view illustrating the housing case with various devices such as a fusion splicer housed therein omitted from illustration.

A housing case 1 and a fusion splicer set 110 according to the embodiment will be described with reference to FIGS. 1 to 3. FIG. 1 is a perspective view illustrating the housing case 1 according to the embodiment. FIG. 2 is a perspective view illustrating the fusion splicer set 110 that includes the housing case 1 with a lid body 30 opened with respect to a case main body 10. FIG. 3 is a perspective view illustrating the housing case 1 with various devices such as a fusion splicer 100 housed therein omitted from illustration. Hereinafter, in a state where the lid body 30 is closed with respect to the case main body 10 (a state illustrated in FIG. 1), a direction along a direction from the case main body 10 toward the lid body 30 (a vertical direction in FIG. 1) is referred to as a thickness direction of the housing case 1.

First, the fusion splicer 100 housed in the housing case 1 will be described with reference to FIG. 2. The fusion splicer 100 is a device for fusion splicing optical fibers. A cover 101 and a heater 102 are provided in the upper portion of the fusion splicer 100. The cover 101 is attached to openably and closably cover a fusion portion (not illustrated) for fusion splicing the optical fibers and prevents wind from entering the fusion portion. The heater 102 is used to heat and shrink a fiber reinforcing sleeve that is put on a fusion splicing portion between the optical fibers fused by the fusion portion. Further, the fusion splicer 100 includes a monitor 103 that displays a fusion splicing status between the optical fibers which are imaged by a camera (not illustrated) disposed inside. In the fusion splicer set 110, the fusion splicer 100, other fusion splicing tools, equipment, and the like are housed in the housing case 1.

The housing case 1 is a case for housing the fusion splicer 100 for an optical fiber. The housing case 1 includes the case main body 10, the lid body 30, and a tray 40. As illustrated in FIG. 2, the lid body 30 is attached to the case main body 10 with hinges 2 to be openable and closable. Since the housing case 1 has the hinges 2, it is possible to transition the lid body 30 from a closed state of the lid body 30 illustrated in FIG. 1 to an opened state of the lid body 30 illustrated in FIG. 2. It is also possible to transition the lid body 30 from the opened state to the closed state. In the present embodiment, the lid body 30 is configured to open approximately 180 degrees with respect to the case main body 10, but the angle at which the lid body 30 can be opened is not limited. For example, the lid body 30 may be configured to open 90 degrees with respect to the case main body 10. Further, the lid body 30 may be separable from the housing case 1.

The housing case 1 has a ring-shaped handle 3. The handle 3 is attached to a side of the case main body 10 opposite to a side on which the hinges 2 are located. An operator can easily carry the housing case 1 by gripping the handle 3. The handle 3 may be provided in the lid body 30. The housing case 1 has a pair of locking members 4. Each locking member 4 is constituted by a pair of metal fittings provided in the case main body 10 and the lid body 30. The lid body 30 is maintained in a closed state by engaging the pair of metal fittings with each other, and unintended opening and closing of the lid body 30 is prevented.

As illustrated in FIG. 1, the housing case 1 includes an insertion portion 5 configured for a cable extending from the inside of the housing case 1 to the outside thereof to be inserted through the insertion portion 5 in a state where the lid body 30 is closed with respect to the case main body 10. The cable may be, for example, a power supply cable used to supply power to the fusion splicer 100. When the cable is a power supply cable, one end of the cable is connected to the fusion splicer 100 and the other end is connected to an external power source. A detailed configuration of the insertion portion 5 will be described later. In the following description, a side on which the handle 3 is located is referred to as a front side of the housing case 1, and a side on which the hinges 2 are located is referred to as a rear side. In addition, in the thickness direction of the housing case 1, a side on which the lid body 30 is located is referred to as an upper side of the housing case 1, and a side on which the case main body 10 is located is referred to as a lower side.

As illustrated in FIG. 3, the case main body 10 is a bottomed box-shaped member with an open top. The case main body 10 has a bottom plate 11 and a first peripheral wall 12 (a first side wall). The bottom plate 11 is a substantially rectangular plate-like member in a plan view and is located at the bottom portion of the case main body 10. The inner side surface of the bottom plate 11 is provided with an uneven portion 11a that can be used for arranging the devices housed in the case main body 10. The inner side surface of the bottom plate 11 may be a flat surface without the uneven portion 11a, or may be provided with a partition plate having a higher height than the uneven portion 11a.

The first peripheral wall 12 is a wall-shaped member rising from the edge portion of the bottom plate 11. The first peripheral wall 12 includes a front side peripheral wall 12a provided with the handle 3, a rear side peripheral wall 12b located on a side opposite to the front side peripheral wall 12a and provided with the hinges 2, and a left side peripheral wall 12c and a right side peripheral wall 12d which connect the front side peripheral wall 12a and the rear side peripheral wall 12b to each other. The left side peripheral wall 12c is a wall-shaped member located on the left side of the case main body 10 when the case main body is viewed from the front side peripheral wall 12a, and the right side peripheral wall 12d is a wall-shaped member located on the right side of the case main body 10 when the case main body 10 is viewed from the front side peripheral wall 12a. The widths of the front side peripheral wall 12a and the rear side peripheral wall 12b are slightly larger than the widths of the left side peripheral wall 12c and the right side peripheral wall 12d. Therefore, the overall shape of the case main body 10 is such that the width in a left-right direction is larger than the width in a front-rear direction. The shape of the case main body 10 is not limited and may be a shape having equal widths in the front-rear direction and in the left-right direction.

The bottom plate 11 and the first peripheral wall 12 may be formed of a resin such as polypropylene or polyethylene. The bottom plate 11 and the lower portion of the first peripheral wall 12 are constituted by stacking members formed of the same material or different materials and are thicker than the upper portion of the first peripheral wall 12. As a result, the fusion splicer 100 can be more reliably protected from impact applied to the lower portion of the housing case 1 when the housing case 1 is dropped. Moreover, due to the difference in thickness, a step surface 20 is provided at the boundary portion between the upper portion and the lower portion of the first peripheral wall 12. The step surface 20 is continuously provided along the inner circumference of the first peripheral wall 12. The edge portion of a tray 40 (see FIG. 2) is placed on the step surface 20.

The lid body 30 is a member that closes an opening of the case main body 10 and has a top plate 31 and a second peripheral wall 32 (a second side wall). The top plate 31 is a substantially rectangular plate-like member in a plan view and is located at the upper portion of the lid body 30. As illustrated in FIG. 2, the inner side surface of the top plate 31 is provided with an uneven portion 31a that matches the shape of the fusion splicer 100. The uneven portion 31a covers the upper portion of the fusion splicer 100 in a state where the lid body 30 is closed. This prevents the fusion splicer 100 from being displaced during transportation of the housing case 1. The top plate 31 may have a flat surface without the uneven portion 31a.

The second peripheral wall 32 is a wall-shaped member rising from the edge portion of the top plate 31. The second peripheral wall 32 has a front side peripheral wall 32a, a rear side peripheral wall 32b, a left side peripheral wall 32c, and a right side peripheral wall 32d. In a state where the lid body 30 is closed, the front side peripheral wall 32a is a wall-shaped member located on the front side of the housing case 1, and the rear side peripheral wall 32b is a wall-shaped member located on the rear side of the housing case 1. Further, the left side peripheral wall 32c is a wall-shaped member located on the left side of the housing case 1, and the right side peripheral wall 32d is a wall-shaped member located on the right side of the housing case 1. The widths of the front side peripheral wall 32a, the rear side peripheral wall 32b, the left side peripheral wall 32c, and the right side peripheral wall 32d are designed to be approximately the same as the widths of the front side peripheral wall 12a, the rear side peripheral wall 12b, the left side peripheral wall 12c, and the right side peripheral wall 12d of the case main body 10, respectively.

The top plate 31 and the second peripheral wall 32 may be formed of a resin such as polypropylene or polyethylene.

The top plate 31 and the second peripheral wall 32 are constituted by stacking members formed of the same material or different materials and are thicker than the upper portion of the first peripheral wall 12 of the case main body 10. As a result, the fusion splicer 100 housed inside the housing case 1 can be more reliably protected from external impact.

The top plate 31 or the second peripheral wall 32 has a window portion W made of a transparent member that transmits visible light. The window portion W may be formed by fitting a transparent resin member into an opening portion formed in the top plate 31 or the second peripheral wall 32, for example. The window portion W may be provided at a position at which a charging status of the fusion splicer 100 is able to be visually recognized. For example, in a case where a lamp indicating the charging status is provided in the right side surface of the fusion splicer 100, the window portion W may be provided in a portion of the top plate 31 near the right side peripheral wall 32d or in the right side peripheral wall 32d. In the present embodiment, the window portion W is provided in the right side peripheral wall 32d of the second peripheral wall 32. The window portion W may be provided in the first peripheral wall 12 of the case main body 10 instead of the lid body 30.

As illustrated in FIG. 2, the first peripheral wall 12 of the case main body 10 has a first edge portion 13, and the second peripheral wall 32 of the lid body 30 has a second edge portion 33. The first edge portion 13 and the second edge portion 33 come into contact with each other when the lid body 30 is closed with respect to the case main body 10. The first edge portion 13 has an annular shape that continuously extends along the upper end portion of the first peripheral wall 12. The second edge portion 33 has an annular shape that extends continuously along the lower end portion of the second peripheral wall 32, similarly to the first edge portion 13. A portion of each of the first edge portion 13 and the second edge portion 33 to which the locking member 4 is attached is recessed inside the case main body 10. When the lid body 30 is closed, as illustrated in FIG. 1, the first edge portion 13 comes into contact with the second edge portion 33 over substantially the entire circumference of the annular shape. As a result, it is possible to prevent water droplets, dust, or the like from entering the housing case 1 through a gap between the case main body 10 and the lid body 30.

As described above, the housing case 1 includes the insertion portion 5 (see FIG. 1) through which the cable extending from the inside of the case main body 10 to the outside thereof can be inserted in a state where the lid body 30 is closed. The insertion portion 5 is constituted by notches 18 and 38 (see FIGS. 4 and 6) provided in the first edge portion 13 and the second edge portion 33, respectively. Each of the notches 18 and 38 constitutes a case notch. The notch 18 constitutes a first case notch, and the notch 38 constitutes a second case notch. The notch 18 is provided in the first edge portion 13 of the right side peripheral wall 12d, and the notch 38 is provided in the second edge portion 33 of the right side peripheral wall 32d. At least a part of the notch 18 overlaps the notch 38 in the thickness direction of the first peripheral wall 12 and the second peripheral wall 32 when the lid body 30 is closed. In the notches 18 and 38, the first edge portion 13 does not come into contact with the second edge portion 33, and an opening portion is formed.

Figure 4:
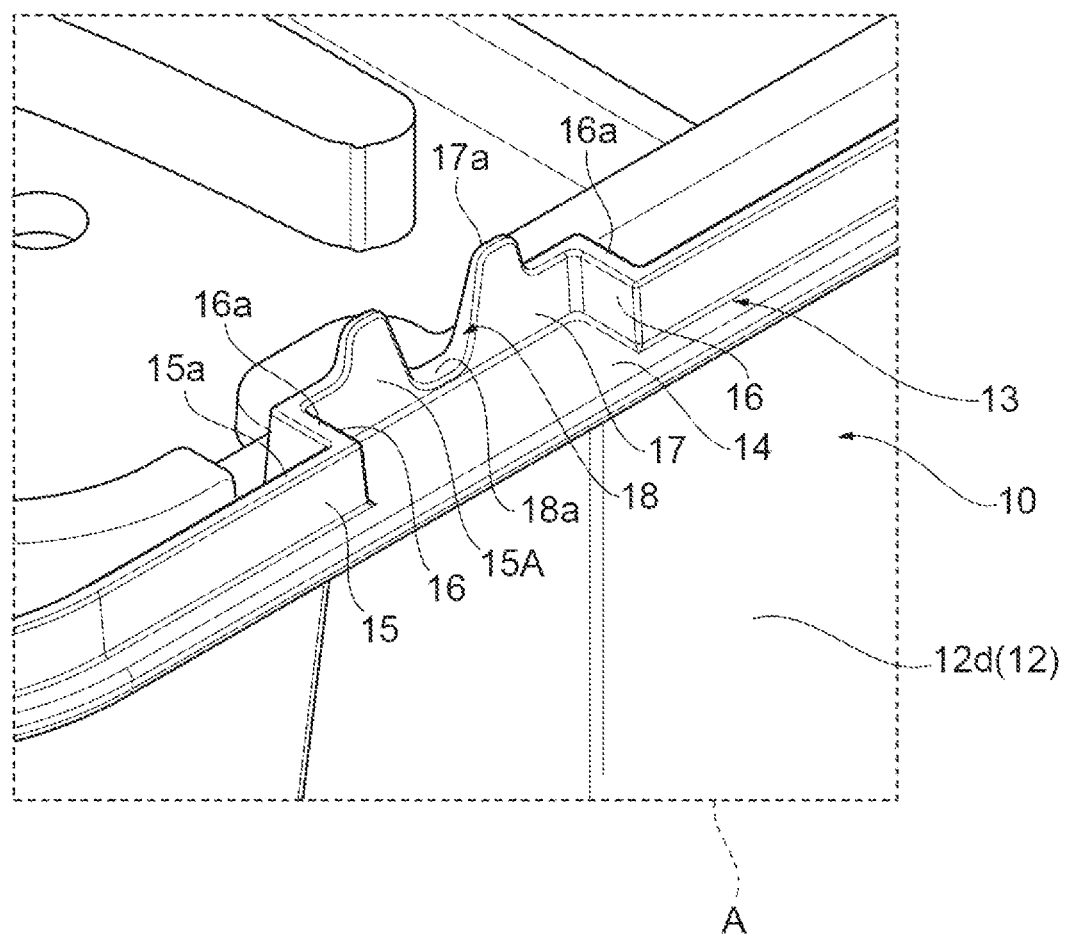
FIG. 4 is an enlarged view of a region A, which is a part of the case main body surrounded by a dashed line illustrated in FIG. 2, with a sealing member omitted from illustration.
Figure 5:
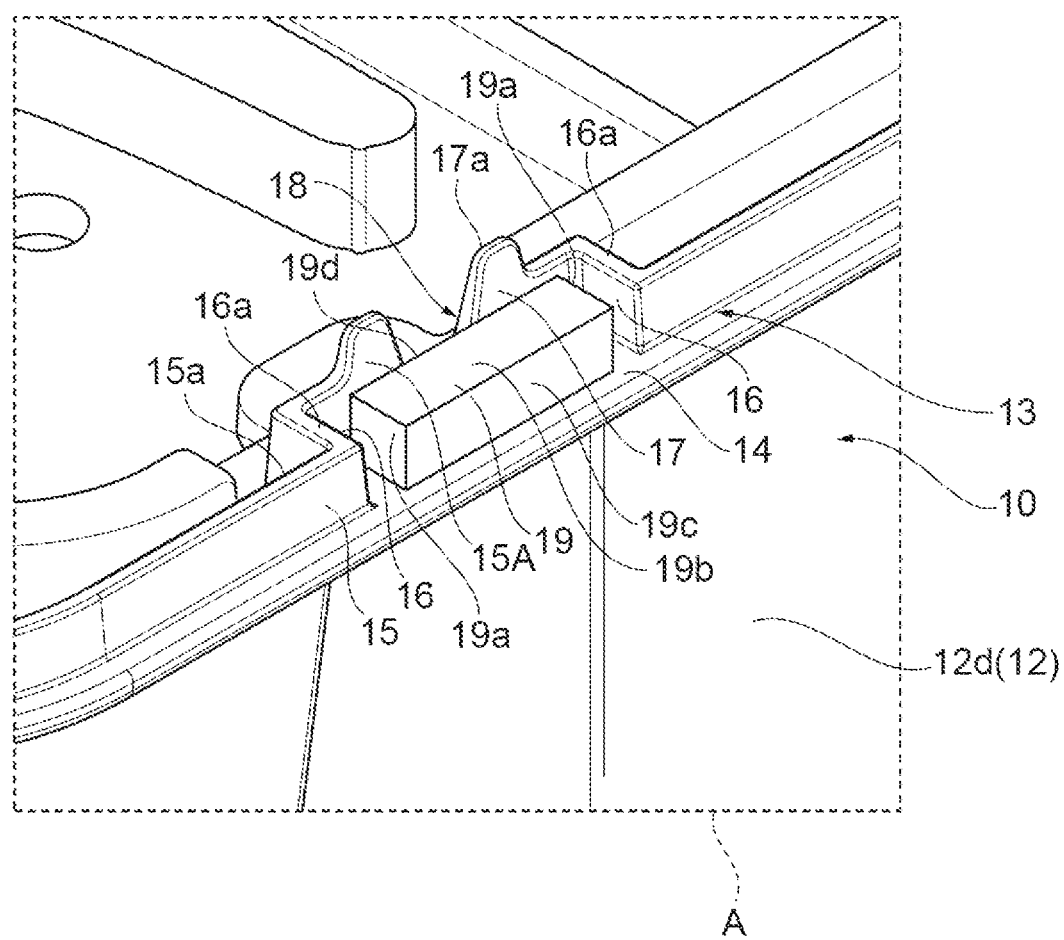
FIG. 5 is an enlarged view of the region A, which is a part of the case main body surrounded by a dashed line illustrated in FIG. 2, with a sealing member illustrated.
Figure 6:
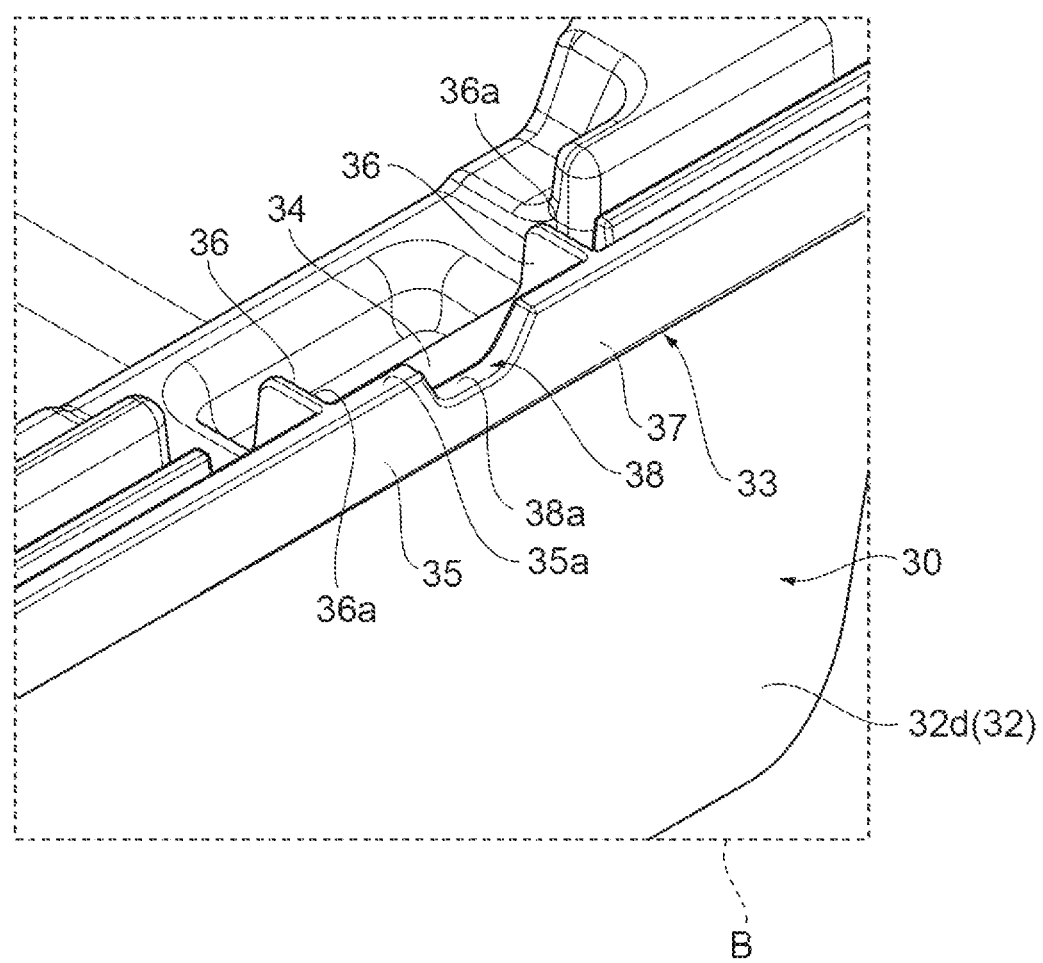
FIG. 6 is an enlarged view of a region B, which is a part of the lid body surrounded by a dashed line illustrated in FIG. 2, with a sealing member omitted from illustration.
Figure 7:
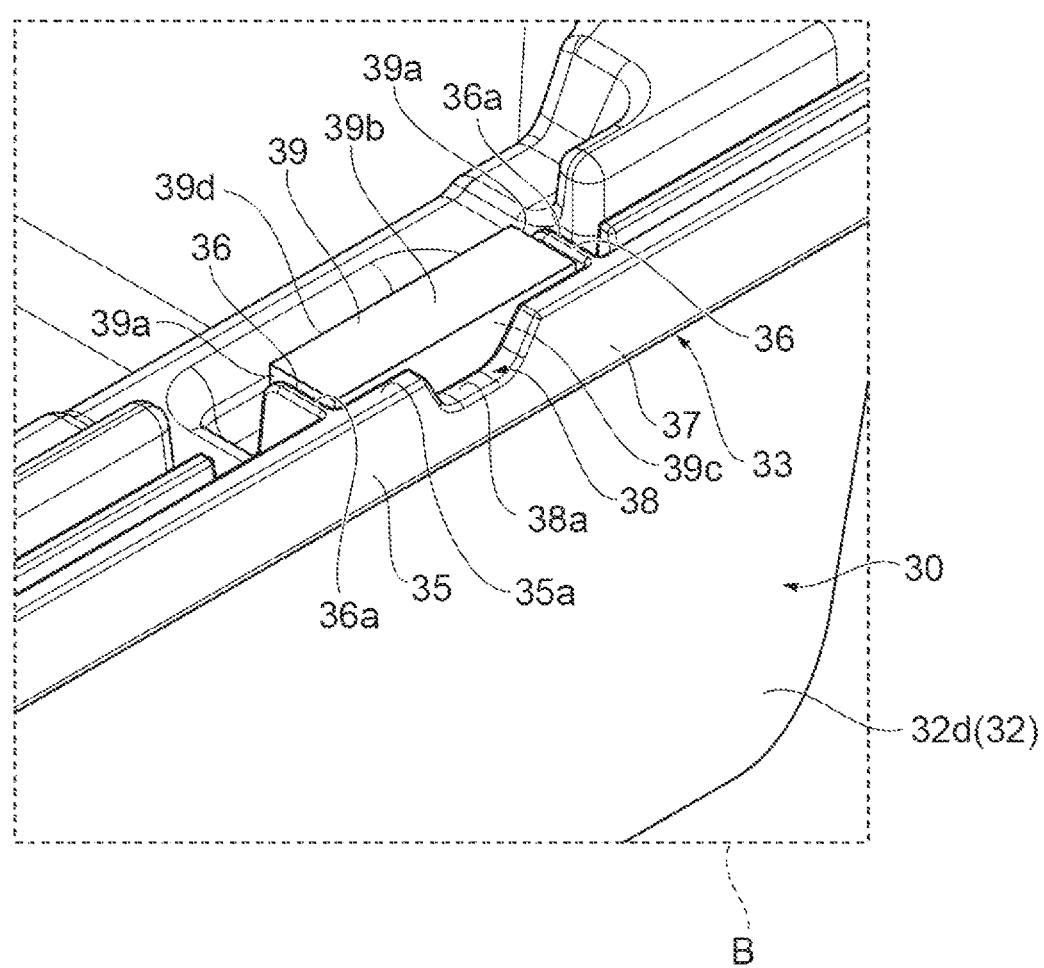
FIG. 7 is an enlarged view of the region B, which is a part of the lid body surrounded by a dashed line illustrated in FIG. 2, with a sealing member illustrated.

A detailed configuration of the notches 18 and 38 will be described with reference to FIGS. 4 to 7. FIGS. 4 and 5 are enlarged views of a region A which is a part of the case main body 10 (a portion of the first edge portion 13 in which the notch 18 is provided) surrounded by a dashed line illustrated in FIG. 2. For convenience of explanation, illustration of a sealing member 19 is omitted in FIG. 4, and the sealing member 19 is illustrated in FIG. 5. FIGS. 6 and 7 are enlarged views of a region B which is a part of the lid body 30 (a portion of the second edge portion 33 in which the notch 38 is provided) surrounded by a dashed line illustrated in FIG. 2. For convenience of explanation, illustration of a sealing member 39 is omitted in FIG. 6, and the sealing member 39 is illustrated in FIG. 7.

The first edge portion 13 has an end surface 14 (a first end surface) and a first thin wall 15, as illustrated in FIG. 4. The end surface 14 is a flat surface provided along the first edge portion 13. The first thin wall 15 is a wall-shaped member standing on the end surface 14, and the majority thereof is provided along the first edge portion 13. The first thin wall 15 partially has a depression portion 15A that is recessed inside the case main body 10. The depression portion 15A includes a pair of lateral wall portions 16 (first lateral wall portions) and an inner wall portion 17. Each lateral wall portion 16 extends toward the inside of the case main body 10 along a direction intersecting with (orthogonal to; in the present embodiment) an extending direction of the first edge portion 13. The pair of lateral wall portions 16 are provided facing each other. Each lateral wall portion 16 has an upper surface 16a at its upper end. The height (the distance from the end surface 14 to the upper surface 16a) of each lateral wall portion 16 is equal to the height (the distance from the end surface 14 to an upper surface 15a) of a portion of the first thin wall 15 in which the depression portion 15A is not provided (hereinafter referred to as a non-depressed portion).

The inner wall portion 17 is located closer to the inside of the case main body 10 than the non-depressed portion of the first thin wall 15. The inner wall portion 17 is provided along a facing direction of the pair of lateral wall portions 16, that is, along the extending direction of the first edge portion 13, and both end portions thereof are connected to the end portions of the lateral wall portions 16. The inner wall portion 17 has an upper surface 17a at its upper end. The notch 18 is provided in the central portion of the inner wall portion 17. The notch 18 is a portion through which the cable extending from the inside of the case main body to the outside thereof is inserted. The notch 18 is formed in a U shape and has a gently curved bottom surface 18a. Further, a connecting portion between the end portion of the notch 18 and the upper surface 17a is smoothly connected as if a corner is removed. As a result, when the cable is disposed in the notch 18, even in a case where the cable comes into contact with the connecting portion, the coating of the cable is less likely to be damaged. The width of the notch 18 in the extending direction of the inner wall portion 17 gradually decreases from the upper surface 17a toward the end surface 14. The shape of the notch 18 is not limited to the shape described above and may be formed in a V shape with a sharp bottom portion, for example.

The height of a portion of the inner wall portion 17 close to the notch 18 (the distance from the end surface 14 to the upper surface 17a) is larger than that of each of both end portions of the inner wall portion 17 connected to the lateral wall portion 16. As a result, it is possible to prevent the cable inserted through the notch 18 from slipping out of the notch 18. In addition, the inner wall portion 17 is configured such that the thickness thereof decreases from the end surface 14 toward the upper surface 17a.

The sealing member 19 (a first sealing member) is disposed on the end surface 14 as illustrated in FIG. 5. The sealing member 19 seals a gap between the notches 18 and 38 and the cable inserted through the notches 18 and 38 in cooperation with the sealing member 39 (see FIG. 7) of the lid body 30. The sealing member 19 is formed of a resilient material. The material of the sealing member 19 may be a silicone rubber, a thermo plastic elastomer (TPE), or a microcell polymer sheet, for example. The hardness of the sealing member 19 is preferably 20 or more and 40 or less, and more preferably 30, for example. The hardness of the sealing member 19 is a value measured on the basis of JIS K 6253.

The sealing member 19 is formed in a rectangular parallelepiped shape and disposed such that its longitudinal direction is along the extending direction of the first edge portion 13. The sealing member 19 has a pair of end surfaces 19a opposing each other in the longitudinal direction. In the present embodiment, each end surface 19a is located slightly apart from a wall surface of the lateral wall portion 16, and these gaps facilitate deformation of the sealing member 19 when the cable is sandwiched. Each end surface 19a may be in contact with the wall surface of the lateral wall portion 16 as long as it does not interfere with the holding of the cable by the sealing member 19. The sealing member 19 has four side surfaces connecting the pair of end surfaces 19a to each other. Of the four side surfaces, a surface (not illustrated) in contact with the end surface 14 is referred to as a lower side surface, and a surface opposing the lower side surface is referred to as an upper side surface 19b. Further, side surfaces connecting the lower side surface and the upper side surface 19b to each other are referred to as an outer side surface 19c and an inner side surface 19d. The outer side surface 19c and the inner side surface 19d are opposed to each other. The outer side surface 19c is located closer to the outside of the case main body 10 than the inner side surface 19d.

The lower side surface adheres to the end surface 14 by an adhesive. As a result, the sealing member 19 is fixed to the first edge portion 13. A fixing method of the sealing member 19 is not limited. For example, in a case where the end surface 14 has a protrusion, the sealing member 19 may be fixed by inserting the protrusion into the lower side surface. The upper side surface 19b is located further apart from the end surface 14 than the upper surface 16a. That is, the thickness of the sealing member 19 (the width from the lower side surface to the upper side surface 19b) is greater than the height of the lateral wall portion 16. Further, the upper side surface 19b is located further apart from the end surface 14 than the bottom surface 18a (see FIG. 4) of the notch 18. That is, at least a part of the sealing member 19 overlaps the notch 18 when the sealing member 19 is viewed from the outer side surface 19c. As a result, when the cable is inserted through the notch 18, the cable is disposed to sink slightly into the interior of the sealing member 19.

The outer side surface 19c is located closer to the outside of the case main body 10 than the wall surface of the non-depressed portion of the first thin wall 15. However, the outer side surface 19c may be located closer to the inside of the case main body 10 than the wall surface of the non-depressed portion of the first thin wall 15, that is, may be located at the depression portion 15A of the first thin wall 15. The inner side surface 19d is located slightly apart from the wall surface of the inner wall portion 17. However, the inner side surface 19d may be located to be in contact with the wall surface of the inner wall portion 17. The shape of the sealing member 19 is not limited to the shape described above. The sealing member 19 may have, for example, a cuboid shape. Further, the upper side surface 19b of the sealing member 19 may be provided with a groove portion extending along a direction connecting the outer side surface 19c and the inner side surface 19d to each other, and the cable may be disposed in the groove portion.

The second edge portion 33 has an end surface 34 (a second end surface) and a second thin wall 35, as illustrated in FIG. 6. The end surface 34 is a flat surface provided along the second edge portion 33. The second thin wall 35 is a wall-shaped member standing on the end surface 34, and the majority thereof is provided along the second edge portion 33. The second thin wall 35 has a pair of lateral wall portions 36 (second lateral wall portions) and an outer wall portion 37. Each lateral wall portion 36 extends toward the inside of the lid body 30 along a direction intersecting with (orthogonal to; in the present embodiment) an extending direction of the second edge portion 33. The pair of lateral wall portions 36 are provided facing each other. Each lateral wall portion 36 has an upper surface 36a at its upper end. The height of each lateral wall portion 36 (the distance from the end surface 34 to the upper surface 36a) is equal to the height of a portion of the second thin wall 35 extending along the second edge portion 33 (the distance from the end surface 34 to an upper surface 35a). The outer wall portion 37 is provided along the second edge portion 33.

The notch 38 is provided in a portion of the outer wall portion 37 corresponding to a region where the pair of lateral wall portions 36 face each other (a portion of the outer wall portion 37 located between the pair of lateral wall portions 36). The notch 38 is a portion through which the cable extending from the inside of the case main body 10 to the outside thereof is inserted. The notch 38 is formed in a U shape and has a gently curved bottom surface 38a. Further, a connecting portion between the end portion of the notch 38 and the upper surface 35a is smoothly connected as if a corner is removed. As a result, when the cable is disposed in the notch 38, even in a case where the cable comes into contact with the connecting portion, the coating of the cable is less likely to be damaged. The width of the notch 38 in the extending direction of the second edge portion 33 gradually decreases from the upper surface 35a toward the end surface 34. The shape of the notch 38 is not limited to the shape described above and may be formed in a V shape with a sharp bottom portion, for example.

The sealing member 39 (a second sealing member) is disposed on the end surface 34 as illustrated in FIG. 7. The sealing member 39 seals a gap between the notches 18 and 38 and the cable inserted through the notches 18 and 38 in cooperation with the sealing member 19 (see FIG. 5) of the case main body 10 when the lid body 30 is closed with respect to the case main body 10. The sealing member 39 is formed of a resilient material, similar to the sealing member 19 described above. The material of the sealing member 39 may be silicone rubber, a thermo plastic elastomer (TPE), or a microcell polymer sheet, for example. The hardness of the sealing member 39 is preferably 20 or more and 40 or less, and more preferably 30, for example. The hardness measurement of the sealing member 39 is performed on the basis of the same standard as the hardness measurement of the sealing member 19 described above.

The sealing member 39 is formed in a rectangular parallelepiped shape and disposed such that its longitudinal direction is along the extending direction of the second edge portion 33. The sealing member 39 has a pair of end surfaces 39a opposing each other in the longitudinal direction. In the present embodiment, each end surface 39a is slightly apart from the wall surface of the lateral wall portion 36, but may be in contact with the wall surface of the lateral wall portion 36. The sealing member 39 has four side surfaces connecting the pair of end surfaces 39a to each other. Of the four side surfaces, a surface (not illustrated) in contact with the end surface 34 (see FIG. 6) is referred to as a lower side surface, and a surface opposing the lower side surface is referred to as an upper side surface 39b. Further, side surfaces connecting the lower side surface and the upper side surface 39b to each other are referred to as an outer side surface 39c and an inner side surface 39d. The outer side surface 39c and the inner side surface 39d are opposed to each other. The outer side surface 39c is located closer to the outside of the lid body than the inner side surface 39d.

The lower side surface of the sealing member 39 adheres to the end surface 34 by an adhesive. As a result, the sealing member 39 is fixed to the second edge portion 33. A fixing method of the sealing member 39 is not limited. For example, in a case where the end surface 34 has a protrusion, the sealing member 39 may be fixed by inserting the protrusion into the lower side surface. The upper side surface 39b is located further apart from the end surface 34 than the upper surface 36a. That is, the thickness of the sealing member 39 (the width from the lower side surface to the upper side surface 39b) is greater than the height of the lateral wall portion 36. Further, the upper side surface 39b is located further apart from the end surface 34 than the bottom surface 38a of the notch 38. That is, at least a part of the sealing member 39 overlaps the notch 38 when the sealing member 39 is viewed from the inner side surface 39d. When the cable is inserted through the notch 38, the cable is disposed to sink slightly into the interior of the sealing member 39.

The outer side surface 39c is located slightly apart from the wall surface of the second thin wall 35 facing it. However, the outer side surface 39c may be located to be in contact with the wall surface. The inner side surface 39d is located closer to the inside of the lid body 30 than the end portion of each lateral wall portion 36. However, the inner side surface 39d may be located closer to the outside of the lid body 30 than the end portion of each lateral wall portion 36, that is, may be located within a region sandwiched between the pair of lateral wall portions 36. The shape of the sealing member 39 is not limited to the shape described above. The sealing member 39 may have, for example, a cuboid shape. Further, the upper side surface 39b of the sealing member 39 may be provided with a groove portion extending along a direction connecting the outer side surface 39c and the inner side surface 39d to each other, and the cable may be disposed in the groove portion.

Figure 8:
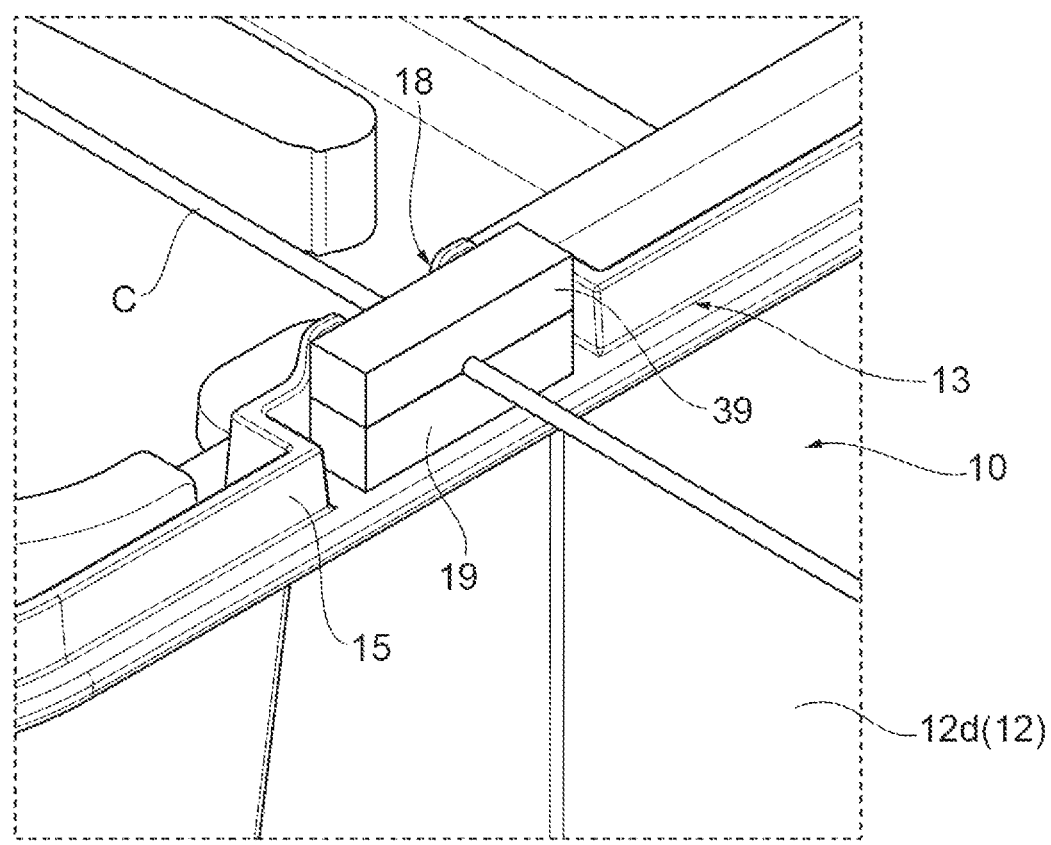
FIG. 8 is a diagram illustrating a state in which a cable is sandwiched between two sealing members.

FIG. 8 is a diagram illustrating a state in which the cable C is sandwiched between the sealing member 19 and the sealing member 39. In FIG. 8, illustration of components of the lid body 30 other than the sealing member 39 is omitted for convenience of explanation. The cable C may be a power supply cable used to supply power to the fusion splicer 100. When the lid body 30 is closed with the cable C inserted into the notch 18 of the case main body 10, the sealing member 19 and the sealing member 39 come into contact with each other such that they overlap each other in the thickness direction of the case main body 10, as illustrated in FIG. 8. Specifically, the upper side surface 19b (see FIG. 5) of the sealing member 19 and the upper side surface 39b (see FIG. 7) of the sealing member 39 come into contact with each other. In a state where the lid body 30 is closed, the second thin wall 35 (see FIG. 7) of the lid body 30 is located closer to the outside of the housing case 1 than the first thin wall 15 of the case main body 10 and the sealing members 19 and 39. That is, the notch 18, the sealing members 19 and 39, and the notch 38 are located to be arranged in that order from the inside toward the outside of the housing case 1. The outer side wall surface of the second thin wall 35 is the outermost peripheral surface of the first peripheral wall 12 and the second peripheral wall 32.

The cable C is sandwiched between the sealing member 19 and the sealing member 39. The sealing member 19 and the sealing member 39 are formed of a resilient material as described above. Therefore, the sealing member 19 and the sealing member 39 are deformed according to the shape of the cable C and come into close contact with the coating of the cable C. The cable C extends from the inside of the housing case 1 to the outside of the housing case 1 through the notch 18, the portion between the sealing member 19 and the sealing member 39, and the notch 38. The cable C may be a power supply cable used to supply power to the fusion splicer 100 as described above, or may be a power supply cable used to supply power to an information terminal (such as a smart phone, for example) for managing fusion work in the fusion splicer 100. Two or more cables C may be sandwiched between the sealing member 19 and the sealing member 39.

Figure 9:
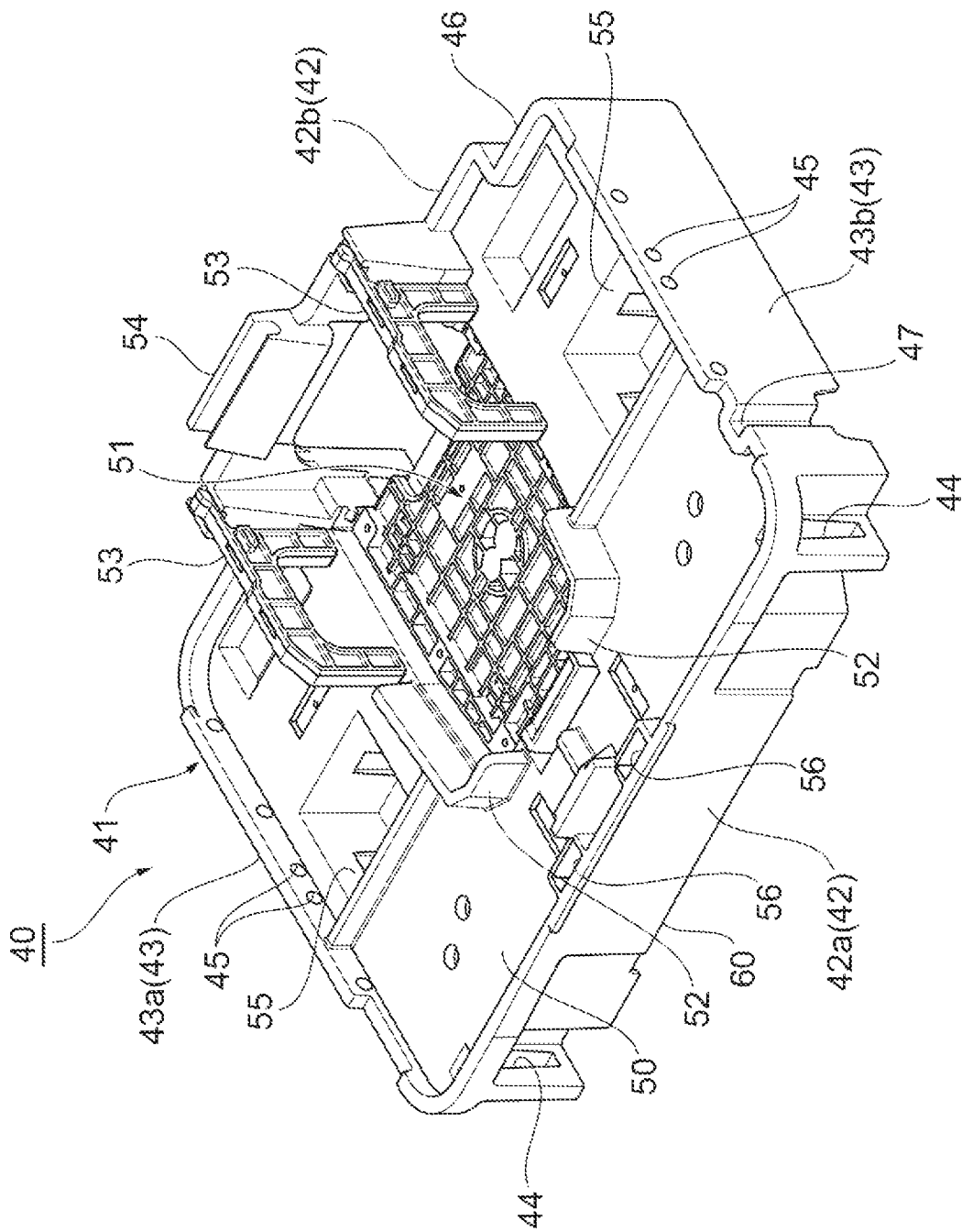
FIG. 9 is a perspective view of a tray from a side of a first region.
Figure 10:
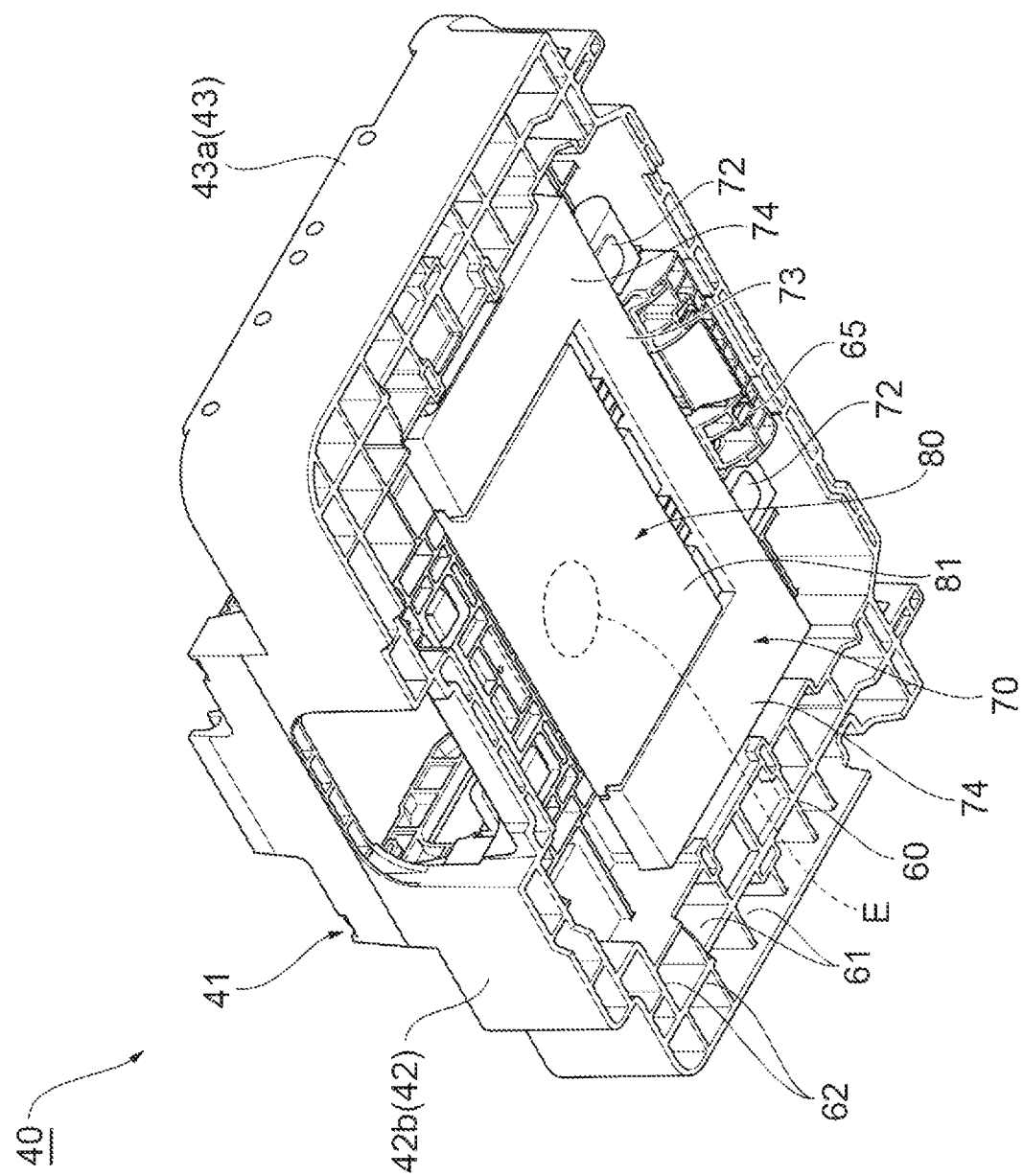
FIG. 10 is a perspective view of a tray from a side of a second region.
Figure 11:
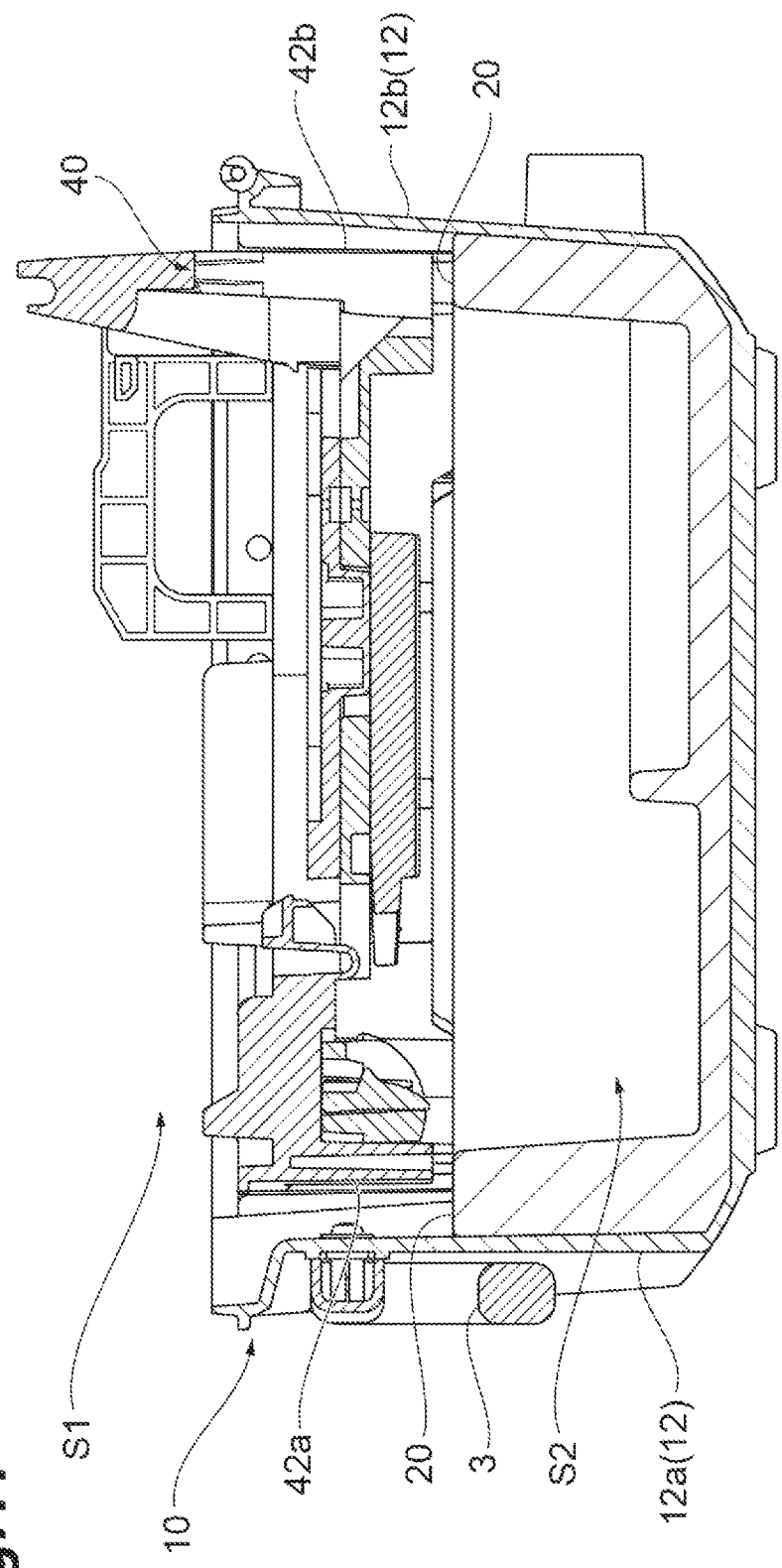
FIG. 11 is a cross-sectional view of the housing case along line XI-XI illustrated in FIG. 2.

A configuration of the tray 40 will be described with reference to FIGS. 9 to 11. FIG. 9 is a perspective view of the tray 40 from a side of a first region 50. FIG. 10 is a perspective view of the tray 40 from a side of a second region 60. FIG. 11 is a cross-sectional view of the housing case 1 along line XI-XI illustrated in FIG. 2. In FIG. 11, for convenience of explanation, illustration of various devices housed in the case main body 10 and the lid body 30, except for the tray 40, is omitted. In the following description, when the tray 40 is housed in the case main body 10 (see FIG. 2), a side facing the front side peripheral wall 12a of the case main body 10 is referred to as a front side of the tray 40, and a side facing the rear side peripheral wall 12b thereof is referred to as a rear side of the tray 40, a side facing the left side peripheral wall 12c thereof is referred to as a left side of the tray 40, and a side facing the right side peripheral wall 12d thereof is referred to as a right side of the tray 40. The tray 40 includes a tray main body 41, a first body contact member 70, and a second body contact member 80.

The tray main body 41 is a work table that houses the fusion splicer 100 and the like in order in the housing case 1 and is used for the fusion splicing work for the optical fibers. The operator positions the tray main body 41 in front of his/her body (for example, abdomen) and performs the fusion splicing work on the tray main body 41. A pair of long wall portions 42 and a pair of short wall portions 43 are provided in the outer peripheral edge portion of the tray main body 41. The pair of long wall portions 42 are wall-shaped members opposing each other and extending along a left-right direction (a first direction) of the tray 40. The pair of short wall portions 43 are wall-shaped members opposing each other and extending along a front-rear direction (a second direction) of the tray 40. The upper side end portions of the pair of long wall portions 42 and the pair of short wall portions 43 slightly protrude upward from the edge portion of the first region 50, which will be described later. This prevents tools and the like placed in the first region 50 and used for the fusion splicing work from falling out of the tray main body 41. Of the pair of long wall portions 42, the long wall portion 42 located on the front side of the tray 40 is referred to as a front side long wall portion 42a (one long wall portion), and the long wall portion 42 located on the rear side of the tray 40 is referred to as a rear side long wall portion 42b. Further, of the pair of short wall portions 43, the short wall portion 43 located on the left side of the tray 40 is referred to as a left side short wall portion 43a, and the short wall portion 43 located on the right side of the tray 40 is referred to as a right side short wall portion 43b.

The front side long wall portion 42a is a portion that comes into contact with the body of the operator during the fusion splicing work. The surface of the front side long wall portion 42a has a gently curved surface shape that is slightly protruded from the outer side (the front side) toward the inner side (the rear side) of the tray main body 41. As a result, the front side long wall portion 42a fits the body of the operator, and the stability of the tray 40 is improved. The front side long wall portion 42a has a pair of first attachment portions 44 to which a belt put around the waist of the operator is attached. Each first attachment portion 44 is provided at each of the left and right end portions of the front side long wall portion 42a. Each first attachment portion 44 is formed in an annular shape, and a belt can be inserted therein. The operator can pass the belt put around his/her waist through each first attachment portion 44 and perform the fusion splicing work in a state where the tray 40 is fixed.

The left side short wall portion 43a and the right side short wall portion 43b each have a second attachment portion 45 to which a strap put around the neck of the operator is attached. The second attachment portion 45 is provided at substantially the center portion of each of the left side short wall portion 43a and the right side short wall portion 43b in the front-rear direction of the tray 40. Each second attachment portion 45 is constituted by two holes penetrating the tray 40 in the left-right direction. When performing the fusion splicing work, the operator first attaches the strap to the tray main body 41 by passing hooks (for example, carabiners) provided at both ends of the strap through two holes. After that, the operator can carry out the fusion splicing work by putting the strap around the neck without continuously holding the tray main body 41.

Notches 46 and 47 depressed inside the tray main body 41 are provided in the right side portion of the rear side long wall portion 42b and the front side portion of the right side short wall portion 43b. Each of the notches 46 and 47 constitutes a tray notch. These notches 46 and 47 serve to connect the space above the tray 40 and the space below the tray 40 to each other when the tray 40 is housed in the case main body 10. Here, an aspect in which the tray 40 is housed will be described with reference to FIG. 11.

As illustrated in FIG. 11, the tray 40 is housed inside the case main body 10 through the opening thereof. The lower side end portions of the front side long wall portion 42a and the rear side long wall portion 42b of the tray main body 41 abut on the step surface 20 of the case main body 10. The internal space of the housing case 1 is partitioned into an upper side housing space S1 and a lower side housing space S2 by the tray 40. The upper side housing space S1 is a space surrounded by the lid body 30 (not illustrated) and the tray 40. The upper side housing space S1 may house the fusion splicer 100, the working tools such as a remover, containers for housing chemicals, and the like. The lower side housing space S2 is a space surrounded by the case main body 10 and the tray 40. An AC adapter, a battery, or the like used to supply power to the fusion splicer 100 may be housed in the lower side housing space S2.

The notches 46 and 47 serve to connect the upper side housing space S1 and the lower side housing space S2 described above to each other. For example, when the power is supplied to the fusion splicer 100 using the power supply cable having an AC adapter in the middle thereof, the AC adapter is housed in the lower side housing space S2. In this case, a portion of the power supply cable which extends from the AC adapter to the fusion splicer 100 is pulled out from the lower side housing space S2 to the upper side housing space S1 through the notch 46. On the other hand, a portion of the power supply cable which extends from the AC adapter to the external power supply is pulled out from the lower side housing space S2 to the upper side housing space S1 through the notch 47. The portion of the power supply cable which is pulled out through the notch 47 to the upper side housing space S1 may be pulled out to the outside of the housing case 1 through the insertion portion 5 (the notches 18 and 38) of the housing case 1.

The tray main body 41 has the first region 50 and the second region 60 defined (surrounded) by the pair of long wall portions 42 and the pair of short wall portions 43, as illustrated in FIGS. 9 and 10. The first region 50 is a region located on one side (the upper side) of the tray main body 41 in the vertical direction (a third direction) of the tray 40. The second region 60 is a region located on a side opposite to the first region 50 (the other side (the lower side) of the tray main body 41) in the tray main body 41 in the vertical direction of the tray 40.

The first region 50 is a substantially rectangular region in a plan view, as illustrated in FIG. 9. Various devices such as the fusion splicer 100 used for the fusion splicing work are placed in the first region 50. A placement portion 51 on which the fusion splicer 100 is placed is provided in the substantially central portion of the first region 50. The placement portion 51 has a shape depressed inside the tray main body 41 and has a bottom surface with a size allowing the fusion splicer 100 to be placed thereon. The bottom surface has a substantially rectangular shape in a plan view.

A front restricting portion 52, a pair of side restricting portions 53, and a rear restricting portion 54 are provided around the placement portion 51 to restrict movement of the fusion splicer 100 placed on the placement portion 51. The front restricting portion 52 is a wall-shaped member rising upward from the first region 50 and is provided to surround a front side corner portion of the placement portion 51. Each side restricting portion 53 is an arch-shaped member having two columns aligned in the front-rear direction of the tray 40 and a rod-shaped connecting portion that extends in the front-rear direction and connects the upper side end portions of the two columns to each other. The pair of side restricting portions 53 are provided such that the placement portion 51 is sandwiched therebetween in the left-right direction of the tray 40. The rear restricting portion 54 is a plate member that connects the rear side end portions of the pair of side restricting portions 53. The first region 50 is provided with a plurality of housing recesses 55 depressed inside the tray main body 41. The housing recess 55 houses a container (for example, a hand wrap) for a chemical used for the fusion splicing work. Further, a plurality of insertion recesses 56 depressed inside the tray main body 41 are provided in the vicinity of the front side long wall portion 42a in the first region 50. Insertion portions 83 (see FIG. 14) of the second body contact member 80 described later are inserted into the insertion recesses 56.

As illustrated in FIG. 10, the second region 60 is a substantially rectangular region in a plan view and located a side opposite to the first region 50. The second region 60 is provided with a plurality of recesses 61 depressed inside the tray main body 41. By providing the recesses 61, cavities are generated inside the tray main body 41, and weight reduction of the tray main body 41 is realized. Moreover, a plurality of beam portions 62 extending linearly are provided between the plurality of recesses 61 to curb a decrease in the strength of the tray main body 41. The shape of the second region 60 is not limited to the shape described above and may be a flat surface shape as a whole. The first body contact member 70 and the second body contact member 80 can be housed in the second region 60.

Figure 12:
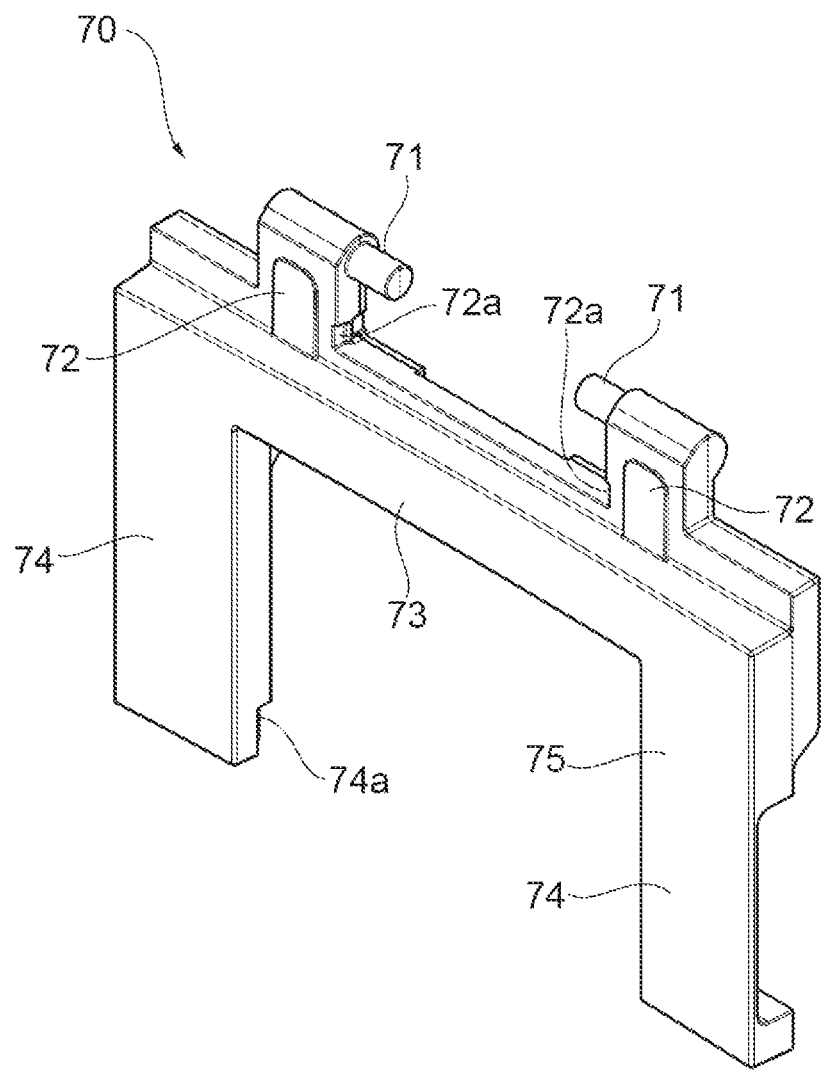
FIG. 12 is a perspective view illustrating a first body contact member.
Figure 13:
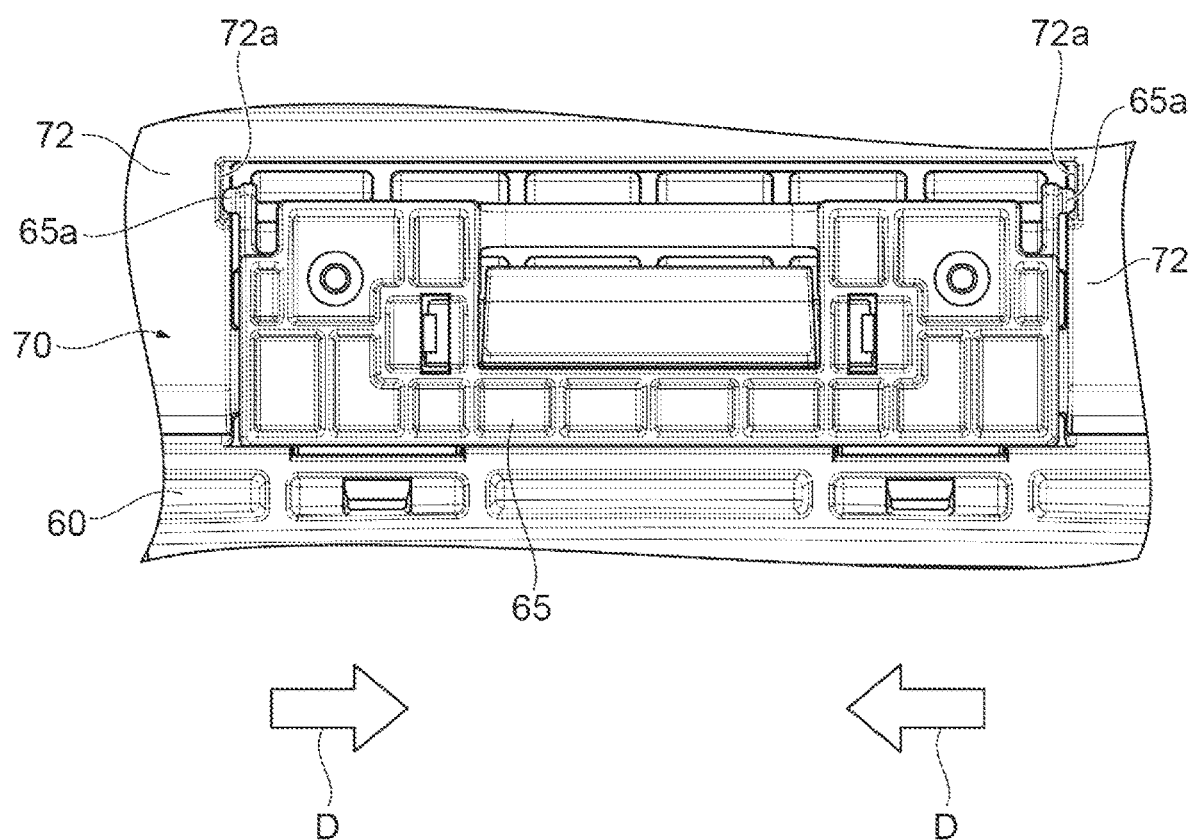
FIG. 13 is an enlarged view of a recess of the first body contact member and a protrusion of a locking member in a state in which the first body contact member is housed.
Figure 14:
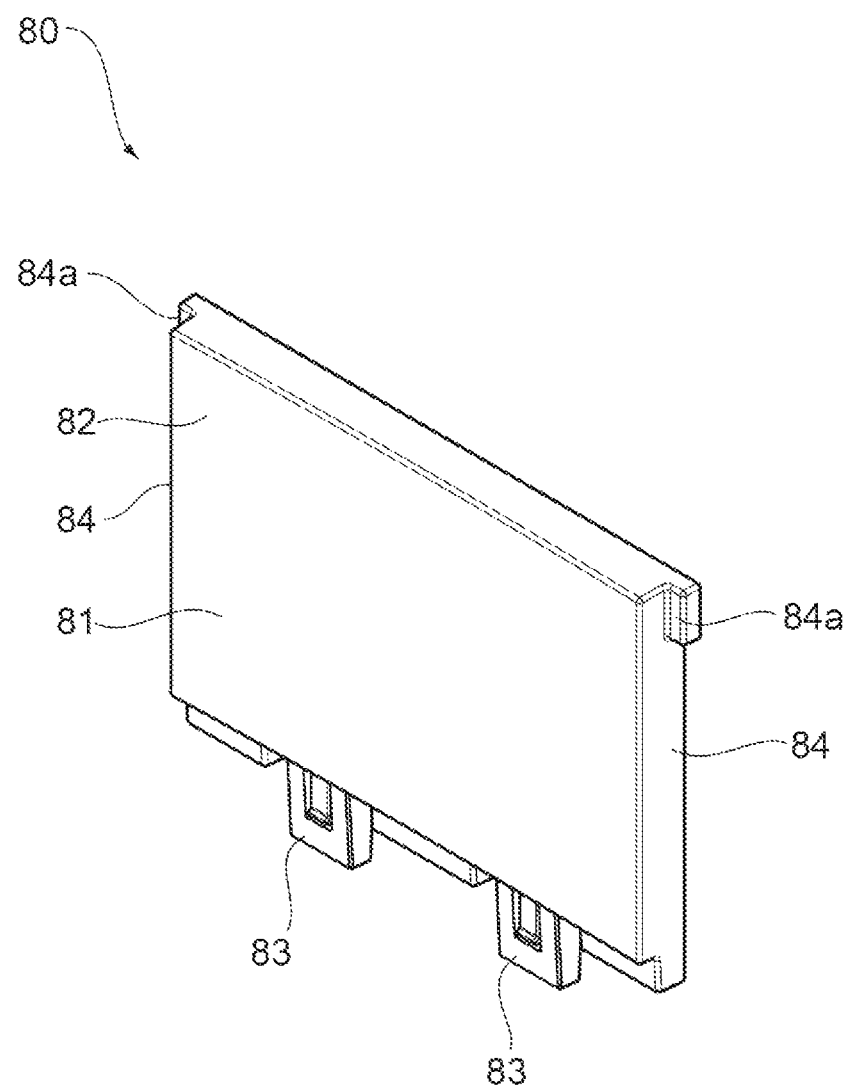
FIG. 14 is a perspective view illustrating a second body contact member.
Figure 15:
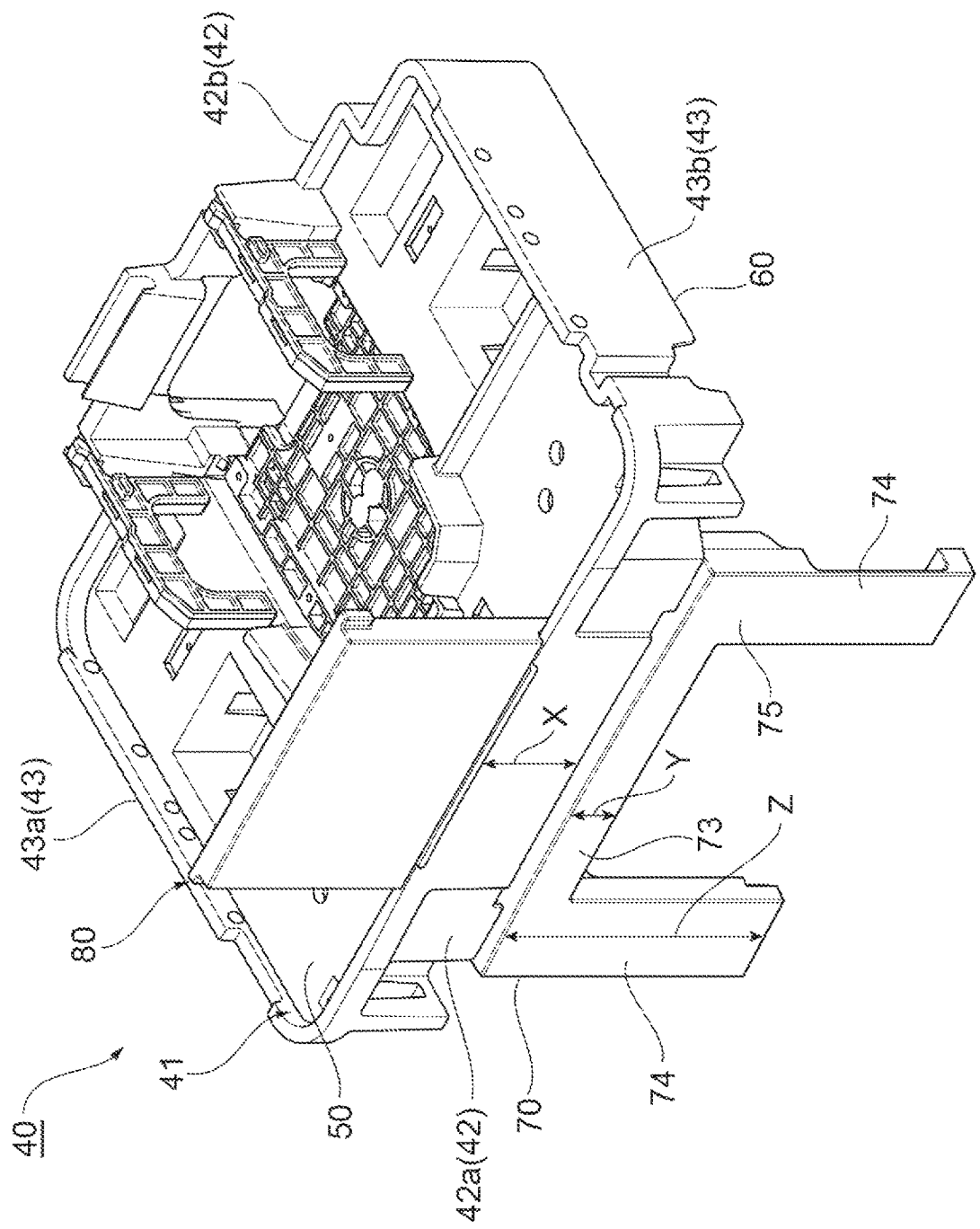
FIG. 15 is a perspective view illustrating the tray with the first body contact member and the second body contact member unfolded.

A detailed configuration of the first body contact member 70 and the second body contact member 80 will be described with reference to FIGS. 12 to 15. FIG. 12 is a perspective view illustrating the first body contact member 70. FIG. 13 is an enlarged view of a recess 72a of the first body contact member 70 and a protrusion 65a of a locking member 65 in a state in which the first body contact member 70 is housed. FIG. 14 is a perspective view illustrating the second body contact member 80. FIG. 15 is a perspective view illustrating the tray 40 with the first body contact member 70 and the second body contact member 80 unfolded.

The first body contact member 70 is a member that comes into contact with the body of the operator during the fusion splicing work. The first body contact member 70 has a pair of shaft portions 71, a pair of connecting portions 72, a main body portion 73, and a pair of leg portions 74, as illustrated in FIG. 12. The pair of shaft portions 71 are cylindrical members extending in the same direction. The pair of shaft portions 71 are located apart from each other in the extending direction. Each shaft portion 71 is inserted into a recess (not illustrated) provided in the second region 60 of the tray main body 41. The pair of shaft portions 71 and the recess provided in the tray main body 41 function as a hinge mechanism. As a result, the first body contact member 70 can be transitioned between a housed state in which the first body contact member 70 is disposed along the extending direction of the tray main body 41 (see FIG. 10) and an unfolded state in which the first body contact member 70 stands against the tray main body 41 (see FIG. 15). As illustrated in FIG. 15, the first body contact member 70 is disposed along the extending direction of the front side long wall portion 42a in the unfolded state.

The pair of connecting portions 72 are members that connect the pair of shaft portions 71 and the main body portion 73 to each other, as illustrated in FIG. 12. Each connecting portion 72 has the recess 72a on the inner side surface thereof. The recess 72a is configured such that the protrusion 65a of the locking member 65 is fitted into the recess 72a. Hereinafter, the locking member 65 will be described. The locking member 65 is provided in the second region 60 of the tray main body 41, as illustrated in FIG. 10. The locking member 65 is a member that maintains the housed state of the first body contact member 70. As illustrated in the enlarged view of FIG. 13, the locking member 65 has a pair of protrusions 65a on the outer side thereof. In the housed state of the first body contact member 70, the protrusions 65a of the locking member 65 are fitted into the recesses 72a of the first body contact member 70, and the first body contact member 70 is locked. As a result, the housed state of the first body contact member 70 is maintained. In a case where the first body contact member 70 is transitioned from the housed state to the unfolded state, both end portions of the locking member 65 are pushed inward (in a direction of arrow D illustrated in FIG. 13) to release the locking of the first body contact member 70.

As illustrated in FIG. 12, the main body portion 73 and the pair of leg portions 74 are elongated plate-like members. In the unfolded state of the first body contact member 70, as illustrated in FIG. 15, the main body portion 73 extends in the left-right direction of the tray 40 along the front side long wall portion 42a. Further, the pair of leg portions 74 extend in the vertical direction of the tray 40 in a direction apart from the tray main body 41 with both ends of the main body portion 73 in the left-right direction as base ends. Each leg portion 74 has a recess 74a inside the tip end portion thereof, as illustrated in FIG. 12. As illustrated in FIG. 10, in the housed state of the first body contact member 70, the second body contact member 80 is housed in a space between the pair of leg portions 74. At this time, a protrusion 84a of the second body contact member 80, which will be described later, is fitted into the recess 74a of each leg portion 74, and thus the second body contact member 80 is prevented from falling out from the space between the pair of leg portions 74.

The length Z of each leg portion 74 is greater than the length (the thickness) X in the vertical direction of the tray main body 41, as illustrated in FIG. 15. For example, the length Z of each leg portion 74 may be twice or more the length X of the tray main body 41. The length X of the tray main body 41 may be, for example, 40 mm or more and 80 mm or less. The length Z of each leg portion 74 may be, for example, 80 mm or more and 120 mm or less. Further, the width Y of the main body portion 73 in the vertical direction of the tray main body 41 is smaller than the length Z of each leg portion 74. For example, the width Y of the main body portion 73 may be one-half or less of the length Z of each leg portion 74, or may be one-fourth or less thereof.

As illustrated in FIG. 10, in the housed state of the first body contact member 70, the second body contact member 80 can be housed in the space between the pair of leg portions 74. Further, a connection portion E to which a tripod that supports the tray 40 is connected is provided in the second region 60 of the tray 40. In FIG. 10, the connection portion E is indicated by a dashed line because it overlaps the second body contact member 80. The connection portion E exists between the pair of leg portions 74 when viewed in the third direction. The connection portion E is provided at a position overlapping the space between the pair of leg portions 74 (the space at which the second body contact member 80 is located in FIG. 10) in the vertical direction of the tray main body 41. That is, when the second body contact member 80 is removed, it is possible to connect the tripod to the connection portion.

As illustrated in FIG. 12, the main body portion 73 and the pair of leg portions 74 have an outer surface 75 that comes into contact with the body of the operator performing the fusion splicing work. The outer surface 75 is a surface on an outer side (the front side) in a direction from an inner side (the rear side) of the tray main body 41 toward the outer side (the front side) in the unfolded state of the first body contact member 70 (see FIG. 15) among the surfaces of the main body portion 73 and the pair of leg portions 74. The outer surface 75 has a gently curved surface shape that is slightly protruded toward the inner side (the rear side) of the tray main body 41. The outer surface 75 may not be entirely curved and may have a partially curved surface portion. For example, only the surface of the main body portion 73 may be curved. Further, the outer surface 75 may be flat as a whole without having a curved surface shape.

The second body contact member 80 is a member that comes into contact with the body of the operator during the fusion splicing work. As illustrated in FIG. 14, the second body contact member 80 has a plate portion 81, a pair of insertion portions 83, and a pair of protrusions 84a. The plate portion 81 is a rectangular plate-like member in a plan view. The plate portion 81 has an outer surface 82. The outer surface 82 is a surface on an outer side (the front side) in a direction from the inner side (the rear side) of the tray main body 41 toward the outer side (the front side) in the unfolded state in which the second body contact member 80 stands on the tray main body 41 (see FIG. 15). The outer surface 82 has a gently curved surface shape that is slightly protruded toward the inner side (the rear side) of the tray main body 41. The outer surface 82 may not be entirely curved and may have a partially curved surface portion. Further, the outer surface 82 may be flat as a whole without having a curved surface shape.

The pair of insertion portions 83 are portions protruding from the lower side end portion of the plate portion 81 toward the outside of the plate portion 81. Each insertion portion 83 is inserted into the insertion recess 56 of the first region 50 illustrated in FIG. 9. The insertion portion 83 has a structure that allows the second body contact member 80 to be attachable to and detachable from the tray main body 41. As a result, the second body contact member 80 can be transitioned between a housed state in which the second body contact member 80 is disposed along the extending direction of the tray main body 41 (see FIG. 10) and an unfolded state in which the second body contact member 80 stands on the tray main body 41 (see FIG. 15). As illustrated in FIG. 15, the second body contact member 80 is disposed along the extending direction of the front side long wall portion 42a in the unfolded state.

The pair of protrusions 84a are provided on the upper portions of a pair of lateral side surfaces 84 that are opposed to each other with the outer surface 82 interposed therebetween. As described above, when the second body contact member 80 is housed in the space between the pair of leg portions 74 (see FIG. 10), each protrusion 84a is fitted into the recess 74a provided in each of the pair of leg portions 74, and thus the second body contact member 80 is prevented from falling out from the space between the pair of leg portions 74.

As described above, in the housing case 1 according to the present embodiment, the insertion portion 5 is provided, and the cable extending from the inside of the housing case 1 to the outside is inserted through the insertion portion 5, and thus, even in a case where the lid body 30 is closed with respect to the case main body 10, the cable is not pinched between the case main body 10 and the lid body 30. As a result, according to the housing case 1, damage to the cable (for example, damage to the coating) due to the pinching is prevented. That is, power can be supplied to the fusion splicer 100 with the lid body 30 closed, and the arrangement space of the housing case 1 can be reduced during power supply.

In the present embodiment, the first peripheral wall 12 has the first edge portion 13, the second peripheral wall 32 has the second edge portion 33, and the first edge portion 13 and the second edge portion 33 come into contact with each other when the lid body 30 is closed with respect to the case main body 10. The insertion portion 5 includes the notch 18 or 38 provided in at least one of the first edge portion 13 and the second edge portion 33. Since the insertion portion 5 includes the notch 18 or 38 provided in the first edge portion 13 of the first peripheral wall 12 or the second edge portion 33 of the second peripheral wall 32, the cable can be easily inserted through the insertion portion 5.

In the present embodiment, the housing case 1 further includes the sealing members 19 and 39 configured to seal the gap between the insertion portion 5 and the cable in a state where the lid body 30 is closed with respect to the case main body 10. In this case, water droplets, dust, or the like is prevented from entering the housing case 1 through a gap between the insertion portion 5 and the cable. As a result, failure of the fusion splicer 100 housed in the housing case 1 can be curbed.

In the present embodiment, the sealing members 19 and 39 may be made of sponge rubber having a hardness of 20 or more and 40 or less. In this case, since the sealing members 19 and 39 have appropriate elasticity, the sealing members come into close contact with the surface of the cable. As a result, the gap between the insertion portion 5 and the cable is more appropriately sealed, and the waterproofness or dustproofness of the housing case 1 is improved.

In the present embodiment, the sealing members 19 and 39 are disposed such that the entire sealing members 19 and 39 are located closer to the inside of the housing case 1 than outermost peripheral surfaces of the first peripheral wall 12 and the second peripheral wall 32. In this case, it is possible to prevent the sealing members 19 and 39 from peeling off from the housing case 1 due to external impact or the like.

In the present embodiment, the sealing members 19 and 39 include the sealing member 19 (the first sealing member) provided in the first edge portion 13 and the sealing member 39 (the second sealing member) provided in the second edge portion 33. The sealing member 19 and the sealing member 39 are located such that the cable is sandwiched therebetween in a thickness direction of the housing case 1 when the lid body 30 is closed. In this case, the sealing members 19 and 39 can be easily disposed around the cable.

In the present embodiment, the housing case 1 for the fusion splicer 100 further includes the tray 40 on which the fusion splicer 100 is able to be placed. The tray 40 is able to be housed in the case main body such that the housing case 1 is partitioned into the upper side housing space S1 and the lower side housing space S2 in the thickness direction of the housing case 1. In this case, tools such as devices and chemicals used for the fusion splicing work can be arranged and housed in the housing case 1. That is, the internal space of the housing case 1 can be effectively utilized.

In the present embodiment, the notches 46 and 47 that connect the upper side housing space S1 and the lower side housing space S2 to each other are provided in the outer peripheral edge portion of the tray 40. In this case, the devices (for example, the fusion splicer 100 and the AC adapter) disposed in the upper side housing space S1 and the lower side housing space S2 can be cable-connected via the notches 46 and 47. That is, the degree of freedom in arranging cable-connected devices is improved.

In the present embodiment, at least one of the case main body 10 and the lid body 30 may have a window portion W made of a transparent member. The window portion W may be formed at a position at which a charging status of the fusion splicer 100 charged through the cable is able to be visually recognized. In this case, the power supply status of the fusion splicer 100 can be easily checked through the window portion W without opening the lid body 30.

Although the embodiment according to the present disclosure is described in detail above, the present invention is not limited to the above embodiment and can be applied to various embodiments.

For example, the insertion portion 5 through which the cable is inserted may be a through hole provided in the first peripheral wall 12 of the case main body 10 or the second peripheral wall 32 of the lid body 30 instead of the notches 18 and 38, and the cable may be inserted through the through hole. A sealing member may be provided in such a through hole.

The first body contact member 70 may be attachable to and detachable from the tray main body 41 similarly to the second body contact member 80. In this case, the state in which the first body contact member 70 is detached from the tray main body 41 corresponds to the housed state of the first body contact member 70. Further, the first body contact member 70 may have a rectangular plate shape in a plan view similarly to the second body contact member 80.

The second body contact member 80 may be able to be housed such that the second body contact member 80 is connected to the tray main body 41 with a hinge mechanism and is folded to a side of the first region 50 of the tray main body 41 similarly to the first body contact member 70. In this case, the second body contact member 80 may have a U shape (the shape similar to the first body contact member 70) with a hollow central portion not to come into contact with the fusion splicer 100 or the like in the housed state.

The first body contact member 70 and the second body contact member 80 may have handles that can be gripped by the operator to facilitate the transition between the unfolded state and the housed state.

REFERENCE SIGNS LIST

1 Housing case
2 Hinge
3 Handle
4 Locking member
5 Insertion portion
10 Case main body
11 Bottom plate
11a Uneven portion
12 First peripheral wall
12a, 32a Front side peripheral wall
12b, 32b Rear side peripheral wall
12c, 32c Left side peripheral wall
12d, 32d Right side peripheral wall
13 First edge portion
14, 34 End surface
15 First thin wall
15A Depression portion
16, 36 Lateral wall portion
15a, 16a, 17a, 35a, 36a Upper surface
17 Inner wall portion
18, 38 Notch
18a, 38a Bottom surface
19, 39 Sealing member
19a, 39a End surface
19b, 39b Upper side surface
19c, 39c Outer side surface
19d, 39d Inner side surface
20 Step surface
30 Lid body
31 Top plate
31a Uneven portion
32 Second peripheral wall
33 Second edge portion
35 Second thin wall
37 Outer wall portion
40 Tray
42 Long wall portion
42a Front side long wall portion
42b Rear side long wall portion
43 Short wall portion
43a Left side short wall portion
43b Right side short wall portion
44 First attachment portion
45 Second attachment portion
46, 47 Notch
50 First region
51 Placement portion
52 Front restricting portion
53 Side restricting portion
54 Rear restricting portion
55 Housing recess
56 Insertion recess
60 Second region
61 Recess
62 Beam portion
65 Locking member
65a Protrusion
70 First body contact member
71 Shaft portion
72 Connecting portion
72a Recess
73 Main body portion
74 Leg portion
74a Recess
75 Outer surface
80 Second body contact member
81 Plate portion
82 Outer surface
83 Insertion portion
84 Lateral side surface
84a Protrusion
100 Fusion splicer
101 Cover
102 Heater
103 Monitor
110 Fusion splicer set
A Region
B Region
C Cable
E Connection portion
S1 Upper side housing space
S2 Lower side housing space
W Window portion

What is claimed is:

1. A housing case for a fusion splicer which is for housing the fusion splicer for an optical fiber, comprising:
a case main body including a first side wall; and
a lid body attached to the case main body to be openable and closable and including a second side wall configured to match the first side wall when closed,
wherein at least one of the first side wall and the second side wall includes an insertion portion configured for a cable extending from the inside of the housing case to the outside thereof to be inserted through the insertion portion in a state where the lid body is closed with respect to the case main body,
wherein the first side wall includes a first edge portion, the second side wall includes a second edge portion, and the first edge portion and the second edge portion come into contact with each other when the lid body is closed with respect to the case main body,
wherein the insertion portion includes a first case notch provided in the first edge portion and a second case notch provided in the second edge portion, and
the housing case further comprises:
a first sealing member provided in the first edge portion; and
a second sealing member provided in the second edge portion, wherein the first sealing member and the second sealing member are configured to seal a gap between the first case notch, the second case notch, and the cable when the lid body is closed with respect to the case main body, wherein the first sealing member is located outside the first case notch, and the second sealing member is located inside the second case notch, and wherein the first sealing member and the second sealing member are configured such that the cable is sandwiched therebetween in a thickness direction of the housing case when the lid body is closed with respect to the case main body.

2. The housing case for a fusion splicer according to claim 1, wherein the first sealing member and the second sealing member are made of sponge rubber having a hardness of 20 or more and 40 or less, the hardness being measured on a basis of JIS K 6253.

3. The housing case for a fusion splicer according to claim 1, wherein the first sealing member and the second sealing member are disposed such that the entire sealing members are located closer to the inside of the housing case than outermost peripheral surfaces of the first side wall and the second side wall.

4. The housing case for a fusion splicer according to claim 1, wherein the first edge portion includes a first end surface and a first thin wall standing on the first end surface, wherein the first thin wall is provided with a depression portion that is recessed inside the case main body, and the depression portion includes a pair of first lateral wall portions and an inner wall portion that extends in a facing direction of the pair of first lateral wall portions, and wherein the first case notch is provided in the inner wall portion of the first thin wall.

5. The housing case for a fusion splicer according to claim 1, wherein the second edge portion includes a second end surface and a second thin wall standing on the second end surface, wherein the second thin wall includes an outer wall portion and a pair of second lateral wall portions extending inward of the case main body from the outer wall portion in a direction intersecting with an extending direction of the outer wall portion, and wherein the second case notch is provided in a portion of the outer wall portion of the second side wall corresponding to a region where the pair of second lateral wall portions face each other.

6. The housing case for a fusion splicer according to claim 1, further comprising:

a tray on which the fusion splicer is able to be placed, wherein the tray is able to be housed in the case main body such that the housing case is partitioned into an upper side housing space and a lower side housing space in a thickness direction of the housing case.

7. The housing case for a fusion splicer according to claim 6, wherein at least one tray notch that connects the upper side housing space and the lower side housing space to each other is provided in an outer peripheral edge portion of the tray.

8. The housing case for a fusion splicer according to claim 1, wherein at least one of the case main body and the lid body includes a window portion made of a transparent member, and wherein the window portion is formed at a position at which a charging status of the fusion splicer charged through the cable is able to be visually recognized.

9. A fusion splicer set comprising:

the housing case according to claim 1; and a fusion splicer for an optical fiber housed in the housing case.

10. A housing case for a fusion splicer which is for housing the fusion splicer for an optical fiber, comprising:

a case main body including a first side wall; and a lid body attached to the case main body to be openable and closable and including a second side wall configured to match the first side wall when closed, wherein at least one of the first side wall and the second side wall includes an insertion portion configured for a cable extending from the inside of the housing case to the outside thereof to be inserted through the insertion portion in a state where the lid body is closed with respect to the case main body, the housing case further comprises:

a tray on which the fusion splicer is able to be placed, wherein the tray is able to be housed in the case main body such that the housing case is partitioned into an upper side housing space and a lower side housing space in a thickness direction of the housing case, and wherein at least one tray notch that connects the upper side housing space and the lower side housing space to each other is provided in an outer peripheral edge portion of the tray.

11. The housing case for a fusion splicer according to claim 10, wherein at least one of the case main body and the lid body includes a window portion made of a transparent member, and wherein the window portion is formed at a position at which a charging status of the fusion splicer charged through the cable is able to be visually recognized.

12. A fusion splicer set comprising:

the housing case according to claim 10; and a fusion splicer for an optical fiber housed in the housing case.

* * * * *